US006649907B2

(12) United States Patent
Ebeling et al.

(10) Patent No.: US 6,649,907 B2
(45) Date of Patent: Nov. 18, 2003

(54) CHARGE REDUCTION ELECTROSPRAY IONIZATION ION SOURCE

(75) Inventors: Daniel D. Ebeling, Madison, WI (US); Michael S. Westphall, Madison, WI (US); Mark A. Scalf, Madison, WI (US); Lloyd M. Smith, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 228 days.

(21) Appl. No.: 09/802,322

(22) Filed: Mar. 8, 2001

(65) Prior Publication Data

US 2002/0125423 A1 Sep. 12, 2002

(51) Int. Cl.[7] .......................... B01D 59/44; H01J 49/00
(52) U.S. Cl. ...................................................... 250/288
(58) Field of Search ................................ 250/288, 282

(56) References Cited

U.S. PATENT DOCUMENTS

| | | | | |
|---|---|---|---|---|
| 4,352,570 A | | 10/1982 | Firth | 366/127 |
| 4,546,253 A | | 10/1985 | Tsuchiya et al. | 250/288 |
| 4,999,493 A | * | 3/1991 | Allen et al. | 250/288 |
| 5,073,713 A | | 12/1991 | Smith et al. | 250/282 |
| 5,076,097 A | | 12/1991 | Zarrin et al. | 73/61.1 |
| 5,192,865 A | | 3/1993 | Zhu | 250/288 |
| 5,247,842 A | | 9/1993 | Kaufman et al. | 73/865.5 |
| 5,504,327 A | | 4/1996 | Sproch et al. | 250/288 |
| 5,611,846 A | | 3/1997 | Overton et al. | 96/102 |
| 5,663,561 A | * | 9/1997 | Franzen et al. | 250/288 |
| 5,750,988 A | | 5/1998 | Apffel et al. | 250/288 |
| 5,767,512 A | | 6/1998 | Eiden et al. | 250/282 |
| 5,811,800 A | * | 9/1998 | Franzen et al. | 250/288 |
| 5,922,976 A | | 7/1999 | Russell et al. | 73/865.5 |
| 5,973,904 A | | 10/1999 | Pui et al. | 361/225 |
| 5,992,244 A | | 11/1999 | Pui et al. | 73/865.5 |
| 6,051,189 A | | 4/2000 | Wick et al. | 422/82.01 |
| 6,093,557 A | | 7/2000 | Pui et al. | 435/173.1 |
| 6,107,623 A | * | 8/2000 | Bateman et al. | 250/282 |
| 6,188,066 B1 | * | 2/2001 | Whitehouse et al. | 250/288 |
| 6,278,111 B1 | * | 8/2001 | Sheehan et al. | 250/288 |
| 2001/0030285 A1 | | 10/2001 | Miller et al. | 250/288 |
| 2001/0035494 A1 | * | 11/2001 | Scalf et al. | 250/288 |
| 2002/0011562 A1 | | 1/2002 | Park | 250/288 |

FOREIGN PATENT DOCUMENTS

| | | | |
|---|---|---|---|
| WO | WO 00/17908 | 3/2000 | H01J/49/04 |

OTHER PUBLICATIONS

Cooper, D.W. and Reist, P.C. (Oct. 1973), "Neutralizing Charged Aerosols with Radioactive Sources," *J. Colloid and Interface Sci.* 45:17–26.

(List continued on next page.)

*Primary Examiner*—John R. Lee
*Assistant Examiner*—Johnnie L Smith, II
(74) *Attorney, Agent, or Firm*—Greenlee, Winner and Sullivan, P.C.

(57) ABSTRACT

Methods and devices for use in mass spectral analysis of samples. In particular, methods and devices for generating ions from liquid samples containing chemical species with high molecular masses. These methods and devices provide a continuous or pulsed stream of gas phase analyte ions of either positive polarity, negative polarity or both possessing either a selected fixed charge-state distribution or one that may be selectively varied with time. More specifically, ion sources with adjustable control of the charge-state distribution of the gas phase analyte ions generated are provided in which charged droplets and/or gas phase analyte ions are exposed to electrons and/or gas phase reagent ions generated by a reagent ion source to provide desired control. A corona discharge exemplifies the reagent ion source employed in charge-state distribution control. In a specific preferred ion source, a corona discharge is provided within a shielded region to minimize the deflection of gas phase analyte ions, charged droplets. The methods and devices provided herein are particularly well-suited to the analysis of polymers and biological species.

50 Claims, 10 Drawing Sheets

OTHER PUBLICATIONS

Chen et al. (1995), "Electrospraying of Conducting Liquids for Monodisperse Aerosol Generation in the 4 nm TO 1.8 $\mu$m Diameter Range," *J. Aerosol Sci.* 26:963–977.

Feng, X, and Agnes, G.R. (May 2000), "Single Isolated Droplets With Net Charge as a Source of Ions," *Amer. Soc. Mass Spec.* 11:393–399.

Fenn, et al. (Oct. 1989), "Electrospray Ionization for Mass Spectrometry of Large Biomolecules," *Science* 246:64–70.

Fenn et al. (1990), "Electrospray ionization–principles and practice," *Mass Spec. Rev.* 9:37–70.

Georghiou et al. (1999), "Characterization of point–plane corona in air at radio frequency using a FE–FCT method," *J. Phys. D: Appl. Phys.* 32:2204–2218.

Griffey et al. (1997), "Oligonucleotide Charge States in Negative Ionization Electrospray–Mass Spectrometry Are a Function of Solution Ammonium Ion Concentration," *J. Am. Soc. Mass Spectrom.* 8:155–160.

Huang et al. (Jul. 1990), "Atmospheric Pressure Ionization Mass Spectrometry," *Anal.Chem.* 62(13):A713–725.

Kaufman et al. (Jun. 1996), "Macromolecule Analysis Based on Electrophoretic Mobility in Air: Globular Proteins," *Anal. Chem.* 68:1895–1904.

Kaufman et al. (1996), "Macromolecule Analysis Based on Electrophoretic Mobility In Air," Anal. Chem. 68:3703.

Kaufman, S.L. (1997), "TSI Working Prototye GEMMA* Macromolecule Analyzer," *TSI Incorporated Advanced Technology Group.*

Kaufman, S.L. (1998), "Analysis of Biomolecules Using Electrospray and Nanoparticle Methods: The Gas–Phase Electrophoretic Mobility Molecular Analyzer (GEMMA)," *J. Aerosol. Sci.* 29(5,6):537–552.

Kaufman et al. (1998), "Analysis of a 3.6–MDa Hexagonal Bilayer Hemoglobin from *Lumbricus terrestris* Using a Gas–Phase Electrophoretic Mobility Molecular Analyzer," *Anal. Biochem.* 259:195–202.

Kaufman, S.L. (Feb. 2000), "Electrospray diagnostics performed by using sucrose and proteins in the gas–phase electrophoretic mobility molecular analyzer (GEMMA)," *Anal. Chim Acta* 406:3–10.

Mann et al. (1989), "Interpreting Mass Spectra of Multiply Charged Ions," *Anal. Chem.* 61:1702–1708.

McLuckey et al. (Mar. 1998) "Ion/Ion Proton–Transfer Kinetics: Implications for Analysis of Ions Derived from Electrospray of Protein Mixtures," *Anal. Chem.* 70:1198–1202.

Mouradian et al. (Mar 1998), "DNA Analysis Using an Electrospray Scanning Mobility Particle Sizer,"*Anal. Chem.* 69:919–925.

Ogorzalek et al. (1992), "A New Approach for the Study of Gas–Phase Ion–Ion Reactions Using Electrospray Ionization," *J. Am. Soc. Mass Spectrom.* 3:695–705.

Sarkissian et al. (Oct. 2000), "Measurement of Phenyllactate, Phenylacetate, and Phenylpyruvate by Negative Ion Chemical Ionization–Gas Chromatography/Mass Spectrometry in Brain of Mouse Genetic Models of Phenylketonuria and Non–Phenylketonuria Hyperphenylalaninemia," *Anal. Biochem.* 280:242–249.

Scalf et al. (Jan. 2000), "Charge Reduction Electrospray Mass Spectometry," *Anal. Chem.* 72:52–60.

Smith et al. (May 1990), "New Developments in Biochemical Mass Spectometry: Electrospray Ionization," *Anal. Chem.* 62:882–899.

Smith et al. (1991), "Principles and practice of electrospray ionization–mass spectrometry for large polyeptides and proteins," *Mass Spectrom. Rev.* 10:359–451.

Stephenson, J.L. and McLucky, S.A. (Nov. 1996), "Ion/Ion Proton Transfer Reactions for Protein Mixture Analysis," *Anal. Chem.* 68:4026–4032.

Stephenson, J.L. and McLucky, S.A. (Sep. 1998), "Simplification of Product Ion Spectra Derived from Multiply Charged Parent Ions via Ion/Ion Chemistry," *Anal. Chem.* 70:3533–3544.

Stephenson, J.L. and McLucky, S.A. (1998), "Charge Manipulation for Improved Mass Determination of High-mass Species and Mixture Components by Electrospray Mass Spectrometry," *J. Mass Spectrom.* 33:664–672.

TSI Incorporated, Particle Instrument Division, (1999) "GEMMA* Method for Macromolecule/Nanoparticle Analysis," [online], [retrieved on May 13, 2000], retrieved from the internet: <http://www.tsi.com/particle/product/gemma/gemma.html>.

TSI Incorporated Partical Instruments, (1998),"Model 3480 Electrospray Aerosol Generator,".

TSI Incorporated Partical Instruments, (1999), "Model 3800 Aerosol Time–of–Flight Mass Spectrometer,".

Wang, H. and Hackett, M. (Jan. 1998), "Ionization within a Cylindrical Capacitor: Electrospray without an Externally Applied High Voltage," *Anal. Chem.* 70:205–212.

Mouradian, S. (Jan. 1998) "Separation and Detection of Nucleic Acids," Ph.D. Thesis, Chemistry, University of Wisconsin–Madison.

* cited by examiner

CHARGE REDUCTION ELECTROSPRAY IONIZATION ION SOURCE

STATEMENT REGARDING FEDERALLY SPONSORED RESEARCH OR DEVELOPMENT

The work was funded by the United States government under NIH grant H G01808.

FIELD OF INVENTION

The present invention relates to ion sources utilizing ion-ion and ion-droplet chemical reactions to modify the charge-state distributions of ions generated by field desorption methods and in particular relates to ion sources that provide adjustable control of ion charge-state distributions produced by electrospray ionization.

BACKGROUND OF THE INVENTION

Over the last several decades mass spectrometry has advanced to the point where it has become one of the most broadly applicable analytical tools to provide fast, sensitive and selective detection of a wide variety of molecules and ions. While mass spectrometric detection provides an effective means for identifying a wide variety of molecules, its use for analyzing high molecular weight compounds is currently hindered by problems related to producing gas phase ions attributable to a given analyte species. In particular, the application of mass spectrometric analysis to determine the composition of mixtures of important biological compounds, such as oligonucleotides and oligopeptides, is severely limited by experimental difficulties related to low sample volatility and unavoidable fragmentation during vaporization and ionization processes. As a result of these limitations, the potential for quantitative analysis of samples containing biopolymers via mass spectrometry remains largely unrealized. For example, the analysis of complex mixtures of DNA molecules produced in enzymatic DNA sequencing reactions is dominated by time-consuming and labor-intensive electrophoresis techniques that may be compromised by secondary structures. The ability to selectively and sensitively detect components of complex mixtures of biological compounds via mass spectrometric methods would aid considerably in improving the accuracy, speed and reproducibility of DNA sequencing methodologies and eliminate interferences arising from secondary structure. It would also open new possibilities for the characterization of complex mixtures of proteins, carbohydrates and other polymeric species.

To be detectable via mass spectrometric methods, a compound of interest must first be produced in the form of a gas phase ion. Accordingly, it is the ion formation process which largely dictates the scope, applicability and limitations of mass spectrometry. Conventional ion preparation methods for mass spectrometric analysis have proven unsuitable for high molecular weight compounds. Vaporization by sublimation and/or thermal desorption is unfeasible for many high molecular weight compounds, including biopolymers, because these species tend to have negligibly low vapor pressures. Ionization methods based upon the desorption process, which consists of emission of ions from solid or liquid surfaces, have proven more effective in generating ions from thermally labile, nonvolatile compounds. While conventional ion desorption methods, such as plasma desorption, laser desorption, fast particle bombardment and thermospray ionization, are more applicable to nonvolatile compounds, these methods suffer from substantial problems associated with ion fragmentation and low ionization efficiencies for compounds with high molecular masses (molecular mass>2000 Dalton). To expand the applicability of mass spectrometric methods to samples containing biological compounds current research efforts have been directed toward developing new desorption and ionization methods suitable for high molecular weight species. As a result of these research efforts, two ion preparation techniques have evolved for the analysis of large molecular weight compounds; matrix assisted laser desorption and ionization-mass spectrometry (MALDI-MS) and electrospray ionization-mass spectrometry (ESI-MS).

MALDI and ESI ion preparation methods have profoundly expanded the role of mass spectrometry for the analysis of nonvolatile high molecular weight compounds including many compounds of biological interest. These ionization techniques provide high ionization efficiencies (ionization efficiency=(ions formed)/(molecules consumed)) and have been demonstrated to be applicable to biomolecules with molecular weights exceeding 100,000 Daltons. In MALDI, analyte is integrated into a crystalline organic matrix and irradiated by a short (≈10 ns) pulse of UV laser radiation at a wavelength resonant with the absorption band of the matrix molecules. Analyte molecules are entrained into a resultant gas phase plume and ionized via gas-phase proton transfer reactions occurring within the plume. While MALDI generally produces ions in singly and/or doubly charged states, significant fragmentation of analyte molecules during vaporization and ionization considerably limits the utility of MALDI as a source of gas phase ions directly attributable to a given parent compound. In addition, the sensitivity of the technique is dramatically affected by sample preparation methodology and the surface and bulk characteristics of the site irradiated by the laser. As a result, MALDI analysis is primarily used to identify the molecular masses of components of a sample and yields little information pertaining to the concentrations or molecular structures of materials analyzed.

In contrast, ESI is a field desorption ionization method that generally provides a means of generating gas phase ions with little interference from analyte fragmentation [Fenn et al., Science, 246, 64–70 (1989)]. Further, ESI provides an output consisting of a highly reproducible, continuous and homogeneous stream of analyte ions and is easily coupled to on-line liquid phase separation techniques such as high performance liquid chromatography (HPLC) and capillary electrophoresis. It is currently believed that field desorption ionization occurs by a mechanism involving strong electric fields generated at the surface of a charged substrate which extract solute analyte ions from solution into the gas phase. In ESI, a solution containing a solvent and an analyte is pumped through a capillary orifice maintained at a high electrical potential and directed at an opposing plate held near ground. The field at the capillary tip charges the surface of the emerging liquid and results in a stream of charged droplets. Subsequent evaporation of the solvent promotes a sequence of Coulombic explosions that results in droplets with a radius of curvature small enough that the electric field at their surface is large enough to desorb analyte species existing as ions in solution. Polar analyte species may also undergo desorption and ionization during electrospray by associating with cations and anions in the solution. Similar to ESI techniques, other field desorption methods have evolved that can successfully prepare ions from nonvolatile, thermally liable, high molecular weight compounds. These techniques differ primarily in the physical manner in which the charged droplets are produced and include aerospray ionization, thermospray ionization and the use of pneumatic nebulization devices.

Since the ionization process proceeds via the formation of highly charged liquid droplets, ions produced by conventional field desorption methods such as ESI invariably possess a variety of multiply charged states for every analyte species discharged. Accordingly, ESI-MS spectra of mixtures are typically a complex amalgamation of peaks attributable to a large number of populated charged states for every analyte present in the sample. Therefore, ESI-MS spectra often possess too many overlapping peaks to permit effective discrimination and identification of the various components of a complex mixture. As a result of this limitation, the use of ESI-MS to analyze mixtures of biopolymers is currently severely hampered.

Recently, research efforts have been directed at expanding the utility of ESI-MS techniques for the analysis of complex mixtures of biopolymers. One method of reducing the spectral complexity of ESI-MS spectra uses computer algorithms that transform experimentally derived multiply charged spectra to "zero charge" spectra [Mann et al., Anal. Chem., 62, 1702 (1989)]. While transformation algorithms take advantage of the precision improvement afforded by multiple peaks attributable to the same analyte species, spectral complexity, detector noise and chemical noise often result in missed analyte peaks and the appearance of false, artifactual peaks. However, the utility of transformation algorithms for interpreting ESI-MS spectra of mixtures of biopolymers may be substantially improved by manipulating the charge-state distribution of analyte ions produced in ESI and/or by operating under experimental conditions providing high signal to noise ratios [Stephenson and McLucky, J. Mass Spectrom. 33, 664–672 (1998)].

Alternatively, the complexity of ESI-MS spectra of mixtures of biopolymers may be reduced by operating the electrospray in a manner that decreases the net number of charge-states populated for a particular analyte compound. The ability to controllably reduce charge-state distributions to the extent that predominantly singly and/or doubly charged ions are formed would result in an ESI ion source well suited for the mass spectrometric analysis of high molecular weight compounds including biopolymers. A variety of methods of charge reduction have been attempted with varying degrees of success.

Griffey et al. report that the charge-state distribution of analyte ions produced by ESI may be manipulated by adjusting the chemical composition of the solution discharged [Griffey et al., J. Am. Soc. Mass Spectrom., 8, 155–160 (1997)]. They demonstrated that modification of solution pH and/or the abundance of organic acids or bases in a solution may result in ESI-MS spectra of oligonucleotides primarily consisting of singly and doubly charged ions. In particular, Griffey et al. report a decrease in the average charge-state observed in the electrospray of solutions of a 14 mer DNA from −7.2 to −3.8 upon addition of ammonium acetate to achieve a concentration of approximately 33 mM. Although altering solution conditions may improve the ease in which ESI spectra are interpreted, it does not allow for controllable charge reduction of all species present in solution. In addition, manipulation of solution composition may compromise ionization and/or transmission efficiencies in the electrospray ionization process.

An alternative approach to control the charge-state distribution of ions produced by ESI is to utilize gas phase chemical reactions of reagent ions to reduce the ionic charges of droplets and/or gas phase analyte ions generated upon electrospray discharge. This approach has the advantage of decoupling ionization and charge reduction processes to provide independent control of charge-state distribution. While independent control of charge reduction provides flexibility in choosing the sample buffer composition and the ESI operating conditions, practical constraints have limited its applicability to the analysis of mixtures of biopolymers.

To achieve a reduction in the charge-state distribution generated in the electrospray discharge of a solution containing a mixture of proteins, Ogorzalek et al. merged the output of an electrospray discharge with a stream of reagent ions generated using an externally housed Corona discharge [Ogorzalek et al., J. Am. Soc. Mass Spectrom., 3, 695–705 (1992)]. In particular, Ogorzalek et al. observed a decrease in the most abundant cation observed in the electrospray discharge of solutions containing horse heart cytochrome c from a charge state of +15 to a charge state of +13 upon merging a stream of anions formed via corona discharge. While the authors report a measurable reduction in analyte ion charge state distribution, generation of a population consisting predominantly of singly and/or doubly charged ions was not achievable.

Pui et al. (U.S. Pat. No. 5,992,244) also report a method for neutralizing charged particles purported to minimize particle losses to surfaces. In this method, charged droplets and/or particles are generated via electrospray and exposed to a flowing stream of oppositely charged electrons and/or reagent ions flowing in a direction opposite to that of the electrospray discharge. The authors describe the use of a neutralization chamber with one or more corona discharges distributed along the housing for producing free electrons and/or ions for neutralizing the output of an electrospray discharge. Electrically biased, perforated metal screens or plates are positioned along the housing of the neutralization chamber between the corona discharges and a neutralization region to create a confined electric field to conduct reagent ions toward the electrospray discharge. In addition, Pui et al., describe a similar charged particle neutralization apparatus in which the corona discharge ion source is replaced with a radioactive source of ionizing radiation for generating reagent ions. In both methods, neutralization is reported to reduce wall losses and enhance neutral aerosol throughput to an optical detection region located downstream of the electrospray discharge.

Stephenson et al., report a method of charge reduction in which singly charged reagent ions are generated by an externally housed glow discharge ion source and injected into the resonance cavity of an ion trap mass spectrometer containing oppositely charged neutralizing analyte ions generated by electrospray discharge [Stephenson and Mc Lucky, J. Mass Spectrom., 33, 664–672 (1998)]. Subsequent gas phase ion-ion reactions between analyte ions and reagent ions within the resonance cavity of the ion trap spectrometer are utilized to reduce the charge-state distribution of analyte ions. While Stephenson et al. report substantial charge reduction, instrumental constraints considerably restricted the range of analyte ion mass to charge ratios (m/z) useable for a given reagent ion. This limitation arises from the need to simultaneously constrain analyte ions and reagent ions to the spacial region within the cavity of the ion trap spectrometer to provide efficient reduction of the charge-state distribution. Accordingly, ion trap charge reduction techniques are less suitable for analysis of mixtures comprising high molecular weight biopolymers with a broad range of molecular masses. In addition, ion trap charge reduction devices are relatively expensive and not easily adaptable to pre-existing commercial ESI systems.

Gas phase reactions between the charged droplet output of an electrospray discharge and bipolar ions generated by a radioactive source have also been reported to affect the charge-state distributions of analyte ions generated in ESI. Zarrin et al. (U.S. Pat. No. 5,076,097) utilized radioactive Polonium strips positioned downstream of an electrospray discharge to convert the highly charged output of the electrospray discharge into a stream of neutral particles prior to optical characterization. The authors report that alpha particles emitted by the radioactive strips result in the formation of a gas comprised of both positively and negatively charged ions capable of neutralizing the particle stream formed upon discharge. By minimizing the loss of charged particles on the walls of the apparatus, the authors suggest that the use of their technique results in greater neutral particle throughput to a optical detection region located downstream of the electrospray discharge.

Kaufman et al. (U.S. Pat. No. 5,247,842) report an apparatus for producing uniform submicrometer droplets that utilizes a method of charge neutralization employing one or more radioactive Polonium strips positioned proximate to an electrospray discharge. The authors teach positioning a radioactive strip proximate to the electrospray, such that the droplets encounter the ions virtually immediately upon their formation. This placement is purported to be crucial in order to avoid droplet disintegration under Coulombic forces by rapidly neutralizing the droplets virtually immediately upon formation. In addition, the authors report a method of charge reduction in which a radioactive Polonium strip is placed upstream of an electrospray discharge apparatus to provide a flowing source of bipolar ions to the electrospray chamber. Finally, Kaufman et al. also suggest that a similar charge neutralization may be possible by positioning other sources of biopolar ions, such as a corona discharge or a source of ultraviolet radiation, proximate to the outlet of an electrospray discharge.

Scalf et al. also report a method of charge reduction that utilizes gas phase reactions of ions formed by a radioactive Polonium disk located downstream of the electrospray discharge [Scalf et al., Anal. Chem, 72, 52–60 (2000)]. Multiply charged analyte ions formed by the electro spray discharge undergo ion-ion chemical reactions that result in a decrease in the charge state distribution. Upon charge reduction, the analyte ions are pulsed into the evacuated flight tube of a time of flight mass spectrometer and detected with a multichannel plate. The authors report that the charge-states of ions produced by electrospray discharge of a liquid sample containing a mixture of proteins may be adjusted to yield predominantly singly and/or doubly charged ions attributable to each species in the sample. While this technique successfully reduces the spectral complexity of ESI-MS spectra, the necessity of a radioactive ion source significantly inhibits the commercial application of the technique due to stringent regulations pertaining to the use of radioactive materials.

It will be appreciated from the foregoing that a need still exists for a method of regulating the charge-state distribution of ions generated in ESI and other field desorption techniques to permit the mass spectral analysis of mixtures containing high molecular weight compounds. The present invention provides exemplary use of a corona discharge ion source located downstream of an electrospray discharge or other field desorption ion source to provide charge reduction. In particular, the present invention provides adjustable control of analyte ion charge-state distributions applicable to either operating polarity of an electrospray ionization apparatus.

SUMMARY OF THE INVENTION

The present invention provides methods and devices for generating ions from liquid samples containing chemical species, including but not limited to chemical species with high molecular masses. The methods and devices of the present invention provide an output comprising a continuous or pulsed stream of gas phase analyte ions of either positive polarity, negative polarity or both possessing either a selected fixed charge-state distribution or one that may be selectively varied with time. More specifically, the present invention provides ion sources with adjustable control of the charge-state distribution of the gas phase analyte ions generated.

In one embodiment, an ion source of the present invention comprises a flow of bath gas that conducts the output of an electrically charged droplet source through a field desorption-charge reduction region cooperatively connected to the electrically charged droplet source and positioned at a selected distance downstream with respect to the flow of bath gas. In this embodiment, either positively or negatively charged gas phase analyte ions of a selected charge state distribution are generated from liquid samples containing analytes. First, the electrically charged droplet source generates a continuous or pulsed stream of electrically charged droplets by dispersing a liquid sample containing at least one chemical species in at least one solvent, carrier liquid or both into a flow of bath gas. The droplets formed may possess either positive or negative polarity corresponding to the desired polarity of ions to be generated. Next, the stream of charged droplets and bath gas is conducted through a field desorption-charge reduction region where solvent and/or carrier liquid is removed from the droplets by at least partial evaporation to produce a flowing stream of smaller charged droplets and multiply charged gas phase analyte ions. Evaporation of positively charged droplets results in formation of gas phase analyte ions with multiple positive charges and evaporation of negatively charged droplets results in formation of gas phase analyte ions with multiple negative charges. The charged droplets, analyte ions or both remain in the field desorption-charge reduction region for a selected residence time controllable by selectively adjusting the flow rate of bath gas and/or the length of the field desorption region.

Within the field desorption-charge reduction region, the stream of smaller charged droplets and/or gas phase analyte ions is exposed to electrons and/or gas phase reagent ions of opposite polarity generated from bath gas molecules by a reagent ion source positioned at a selected distance downstream of the electrically charged droplet source. The reagent ion source is surrounded by a shield element for substantially confining the boundaries of electric fields and/or electromagnetic fields generated by the reagent ion source. In a preferred embodiment, the shield element is grounded. In an alternate preferred embodiment, the shield element is electrically biased and held at an electric potential close to ground. In a more preferred embodiment the shield element is held at approximately 250 V or approximately −250 V.

The shield element defines a shielded region wherein electric and/or electromagnetic fields are minimized. In a preferred embodiment the field desorption-charge reduction region is within the shielded region. Minimizing the extent of electric fields and/or electromagnetic fields in the field desorption-charge reductive region is desirable to minimize deflection of gas phase analyte ions, charged droplets or both by electric and/or electromagnetic fields. Accordingly, minimizing the presence of electric and/or electromagnetic fields is beneficial for maximizing the analyte ion throughput of the field desorption-charge regulation region.

Electrons, reagent ions or both, generated by the reagent ion source, react with charged droplets, analyte ions or both within at least a portion of the field desorption-charge reduction region and reduce the charge-state distribution of the analyte ions in the flow of bath gas. Accordingly, ion-ion, ion-droplet, electron-ion and/or electron-droplet reactions result in the formation of gas phase analyte ions having a selected charge-state distribution. In a preferred embodiment, the charge state distribution of gas phase analyte ions is selectively adjustable by varying the interaction time between gas phase analyte ions and/or charged droplets and the gas phase reagent ions and/or electrons. In addition, the charge-state of gas phase analyte ions may be controlled by adjusting the rate of production of electrons, reagent ions or both from the reagent ion source. In addition, an ion source of the present invention is capable of generating an output consisting of analyte ions with a charge-state distribution that may be selected or may be varied as a function of time.

In an exemplary embodiment, an ion source of the present invention comprises a field desorption-charge reduction region substantially free of electric fields and/or electromagnetic fields generated by the reagent ion source. Minimizing the extent of electric and/or electromagnetic fields in the field desorption-charge reduction region is beneficial because it prevents unwanted loss of charged droplets and/or ions on the walls of the apparatus and allows for efficient collection of ions generated by the ion source of the present invention. However, as the droplets and analyte ions are themselves electrically charged, maintaining a field desorption-charge reduction region completely free of electric fields is not possible.

The generation of electrically charged droplets in the present invention maybe performed by any means capable of generating a continuous or pulsed stream of charged droplets from liquid samples containing chemical species. In an exemplary embodiment, an electrospray ionization source is employed in which sample is pumped through an orifice held at a high electric potential and directed at an opposing metal plate held near ground. The potential difference between the orifice and metal plate is sufficiently high to create an electric field at the surface of the emerging liquid to disperse it into a fine spray consisting of charged droplets. Applying a positive electric potential to the orifice results in formation of positively charged droplets while selection of a negative electric potential results in formation of negatively charged droplets. Other electrically charged droplet sources useful in the present invention include, but are not limited to: nebulizers, pneumatic nebulizers, thermospray vaporizers, cylindrical capacitor generators, atomizers, and piezo-electric pneumatic nebulizers.

The generation of electrons and/or reagent ions in the present invention maybe performed by any means capable of generating electrons and/or reagent ions from bath gas molecules. In an exemplary embodiment, the reagent ion source generates electric fields and/or electromagnetic fields. In a preferred exemplary embodiment, the reagent ion source comprises a corona discharge positioned at a selected distance downstream of the electrically charged droplet source. In a more preferred embodiment, the corona discharge is selectively positionable at any point downstream of the electrically charged droplet source. The corona discharge comprises a first electrically biased element and a second element held at ground or substantially close to ground. The first and second elements are positioned sufficiently close to create a self-sustained electrical gas discharge. In this embodiment, the first electrically biased element may be held at either a positive voltage or a negative voltage. First and second corona discharged elements may have an adjustable potential difference ranging from approximately 10,000 V to approximately −10,000 to provide control of the abundance of gas phase reagent ions produced within the field desorption-charge reduction region. Control of the abundance of the gas phase reagent ions is desirable to allow for selectable adjustment of the charge-state distribution of the analyte ions comprising the output of the ion source of the present invention. In a more preferred embodiment the corona discharge comprises an electrically biased wire electrode positioned close enough to a metal disc held at ground or substantially close to ground. The wire electrode and the metal disc are arranged in a point to plane geometry and separated by a distance sufficiently close to create a self-sustained electrical gas discharge. In another exemplary embodiment, the reagent ion source comprises a plurality of corona discharges. Other reagent ion sources useful in the present invention include but are not limited to an arc discharge, a plasma, a thermionic electron gun, a microwave discharge, an inductively coupled plasma and a laser or other source of electromagnetic radiation. In another exemplary embodiment, the reagent ion source comprises an externally housed flowing reagent ion source cooperatively coupled to the field desorption-charge reduction region and capable of providing a flow of reagent ions into the field desorption-charge reduction region.

In the present invention, the reagent ion source is substantially surrounded by a shield element for substantially confining the electric field, electromagnetic field or both generated by the reagent ion source. Accordingly, the shield element defines a shielded region wherein fields are minimized and in which charge reduction occurs. In an exemplary embodiment, the field desorption-charge reduction region is within the shielded region. In a preferred embodiment, a wire mesh screen held at an electric potential close to ground is positioned in a manner to substantially surround the reagent ion source and functions to substantially confine electric fields and/or electromagnetic fields generated. In another preferred embodiment, the shield is grounded. As a consequence of the presence of a shield, only one polarity of ion generated by the corona discharge is able to pass into the shielded region and interact with charged droplets and/or analyte ions. It is believed that this is due to the effect of electric fields generated by application of either positive or negative voltages to the first element of the corona discharge. Application of a negative voltage to the first biased corona discharge element results in the passage of negatively charged reagent ions into the shielded region and application of a positive voltage to the first biased corona discharge element results in passage of positively charged reagent ions into the shielded region.

The distance between the charged droplet source and the reagent ion source is selectively adjustable in the ion source of the present invention. In a preferred embodiment, the charged droplet source and/or the reagent ion source is moveable along a central chamber axis to permit adjustment of this dimension. It is believed that variation of this distance affects the field desorption conditions and extent of field desorption achieved. Accordingly, changing the distance between droplet source and reagent ion source is expected to affect the total output of the ion source of the present invention. Larger distances between droplet source and reagent ion source tend to allow for a greater extent of field desorption than shorter distances and, hence, tend to result in greater net ion production. In addition, variation of the distance between droplet source and reagent ion source may also affect field desorption conditions by changing the distribution of charge at the surface of the charged droplets.

A smaller distance between droplet source and reagent ion source may lead to greater reagent ion/charged droplet interaction, thereby attenuating the charge on the droplet's surface by charge scavenging. Scavenging of charge on the surface of the droplets is believed to have several effects on the field desorption process. First, charge scavenging can cause a net reduction in the extent and/or rate of field desorption of ions. Second, it may result in generation of analyte ions with a lower charge state distribution than that observed in the absence of charge scavenging.

The present invention may be utilized to generate a continuous or pulsed stream of analyte ions comprising negative ions, positive ions or both. In a preferred embodiment, the ion source of the present invention generates an output of gas phase analyte ions comprising substantially of singly charged ions and/or doubly charged ions. More preferably for certain applications, an ion source of this invention generates an output consisting essentially of singly and/or doubly charged ions. In particular, the present invention is highly suitable for generating singly charged ions and/or doubly charged ions from high molecular weight compounds in liquid samples. For example, the present invention may be used to produce singly and/or doubly charged gas phase ions from liquid samples containing at least one oligonucleotide and/or oligopeptide.

Alternatively, for certain applications an ion source of the present invention is useful for producing an output comprising multiply charge ions of a selected charge distribution. For example, singly charged analyte ions generated from chemical species with very high molecular weights can possess mass to charge ratios outside the detectable range of conventional mass spectrometers. Accordingly, the capability of the present invention to generate analyte ions of a selected multiply charged state from such chemical species permits the ion source of the present invention to generate detectable ions from chemical species with masses that extend beyond the mass range of conventional mass spectrometers.

Although the ion source of the present invention may be used to generate ions from any chemical species, it is particularly useful for generating ions from high molecular weight compounds, such as peptides, oligonucleotides, carbohydrates, polysaccharides, glycoproteins, lipids and other polymers. In addition, the ion source of the present invention may be utilized to generate gas phase analyte ions which possess molecular masses substantially similar to the molecular masses of the parent chemical species from which they are derived while present in the liquid phase. Most preferably for certain applications, the present invention may be utilized to generate singly and or doubly charged gas phase analyte ions possessing substantially similar molecular masses to the chemical species from which they are derived while present in the liquid phase. Accordingly, the present invention comprises an ion source causing minimal fragmentation to occur during the ionization process. In addition, the present invention provides methods of reducing the fragmentation of gas phase ions generated by electrospray ionization.

Alternatively, the ion source of the present invention may be used to induce and control analyte ion fragmentation by selectively varying the extent of multiple charging of the gas phase analyte ions generated. Gas phase ion fragmentation is typically a consequence of the substantially large electric fields generated upon formation of highly multiply charged gas phase ions. The occurrence of fragmentation may be useful in determining the identity and structure of chemical species present in liquid samples, the condensed phase and/or the gas phase. Accordingly, the ion source of the present invention maybe used to induce fragmentation of gas phase analyte ions by operating under experimental conditions that yield an output comprising multiply charged gas phase analyte ions in a selected charged state. In addition, an ion source of the present invention is capable of controllably adjusting the charge-state distribution of gas phase analyte ions to provide reproducible control over the gas phase ion fragmentation conditions. The ability to control fragmentation conditions is beneficial for the determination of analyte identity, structure and composition. Accordingly, the present invention provides a method of probing analyte identity and structure via controllable fragmentation.

In a preferred embodiment, the charge-state distribution of the gas phase analyte ions generated by the devices and methods of the present invention is adjustable by: 1.) varying the concentration of electrons and/or reagent ions generated within the field desorption region and 2.) by controlling the residence time of charged droplets and/or analyte ions in the field desorption-charge reduction region. The concentration of electrons and/or reagent ions generated in the field desorption region may be varied, for example, by adjusting the rate of electron and/or reagent ion production by the reagent ion source. Higher concentrations of reagent ions in the field desorption region results in an increase in the extent of charge reduction and lower concentrations of reagent ions results in a decrease in the extent of charge reduction. Control of the residence time of charged droplets and/or analyte ions in the field desorption-charge reduction region may be achieved, for example, by varying the linear flow rate of bath gas through the field desorption-charge reduction region, by adjusting the length of the field desorption-charge reduction region or both. In addition, it is believed that varying the charge-state distribution of the reagent ions generated within the field desorption region may also affect the charge-state distribution of analyte ions generated by the ion source of the present invention. It is believed that the charge-state distribution of the reagent ions in the field desorption-charge reduction region may be selectively adjusted by varying the operating conditions and type of reagent ion source employed. Accordingly, the present invention provides a means of producing ions from liquid samples in which the charge state distribution of the ions produced may be selectively controlled.

In a preferred embodiment, the ion source of the present invention comprises a source of ions whereby ionization processes and charge reduction processes are independently adjustable. Accordingly, the invention is not limited to any one means of ion formation and includes the combination of any ionization method capable of generating gas phase ions from liquid samples with the charge reduction methods described. This arrangement provides independent control of the charge-state distribution attainable without affecting the efficiency of the ion formation process employed. This characteristic of the present invention allows for efficient production of ions of varying charge-state distribution over a wide range of experimental conditions. Also this characteristic enables the methods of charge reduction of the present invention to be employed in combination with virtually any source of gas phase ions, charged droplets or both.

In another embodiment, the electrically charged droplet source is operationally coupled to an online purification system to achieve solution phase separation of solutes in a sample containing analytes prior to gas phase analyte ion formation. The online purification system may be any instrument or combination of instruments capable of online liquid phase separation. Prior to droplet formation and subsequent gas phase analyte ion production, sample containing solute is separated into fractions which contain a subset of species (including analytes) of the original solution. For example, separation may be performed so that each analyte is contained in a separate fraction. This configuration allows for ionization and charge reduction experimental conditions to be optimized for each separated fraction and/or individual analyte in the sample as it elutes from the liquid phase separation apparatus into the droplet source. The application of such separation techniques may significantly simplify sample analysis. In addition, the methods and devices of this preferred embodiment allow for formation of droplets that preferentially contain enhanced concentrations of analytes present in solution. Online purification methods useful in the present invention include but are not limited to high performance liquid chromatography, capillary electrophoresis, liquid phase chromatography, super critical fluid chromatography and/or microfiltration techniques. This preferred embodiment is particularly useful for purification and separation of samples containing one or more oligopeptide and/or oligonucleotide analytes prior to gas phase analyte ion production. Alternative embodiments include combinations of a plurality of online purification systems cooperatively coupled to the ion source of the present invention.

In another preferred embodiment, the ion source of the present invention is capable of simultaneously producing gas phase analyte ions of positive and negative polarities. These embodiments utilize reagent ion sources that generate both positive and negative gas phase reagent ions and allow both to interact with the stream of charged particles and/or gas phase analyte ions in the field desorption-charge regulation region. Positively and negatively charged reagent ions are formed in a periodic fashion and/or simultaneously in a manner which enables them to interact with charged particles and gas phase analyte ions in the field desorption-charge reduction region. This preferred embodiment allows for generation and charge-state reduction of analyte ions of either polarity. In addition, these embodiments may potentially serve as a means of re-ionizing analyte ions or droplets that undergo complete neutralization in the field desorption-charge reduction region. This may be accomplished by ion-molecule reactions between gas phase analyte ions and a bipolar reagent ion gas.

In an exemplary embodiment, the reagent ion source comprises a radio-frequency corona discharge comprising a first electrically biased element capable of oscillating between positive and negative voltages and a second element held at ground or near ground. The radio-frequency corona discharge provides a periodic source of positively and negatively charged reagent ions to the field desorption-charge reduction region. In another exemplary embodiment, the ion source of the present invention comprises a plurality of corona discharges. In this embodiment, the reagent ion source comprises at least one positive mode corona discharge, comprising a first electrically biased element held at a positive voltage and a second element held at ground or substantially close to ground, and at least one negative mode corona discharge, comprising a first electrically biased element held at a negative voltage and a second element held at ground or substantially close to ground. Negative and positive corona discharges are positioned downstream of the charged droplet source and individually surrounded by a shield element. The combination of positive and negative corona discharges provides simultaneous generation of positive and negative reagent ions in the field desorption-charge reduction region. It should be noted that any ion source capable of providing gas phase reagent ions of both positive and negative polarity to the field desorption-charge reduction region is useable in the present invention.

The present invention also comprises methods and devices for generating ions from gas phase neutral compounds generated from liquid samples. In an exemplary embodiment, electrically charged and/or neutral droplets are generated, entrained into a flow of bath gas and passed through an ionization region wherein neutral species are released into the gas phase. Within the ionization region gas phase neutral analytes undergo ion-neutral chemical reactions ionizing the gas phase neutral analytes thereby generating a flow of gas phase analyte ions. In this manner, gas phase neutral analytes are converted into gas phase analyte ions with an adjustable charge-state distribution. In a preferred embodiment, the output of the ion source of the present invention comprises singly charged ions, doubly charged ions, or both, generated from gas phase neutrals. Similarly, the present invention also comprises methods and devices for generating charged droplets from a stream of neutral droplets. In this embodiment, neutral droplets interact with reagent ions generated by the reagent ion source. Ion-droplet reactions result in charge accumulation on the droplets resulting in an output comprising a stream of charged droplets with a selectively adjustable charge state distribution.

In another embodiment, the ion source of the present invention is operationally coupled to a device capable of classifying and detecting charged particles. This embodiment provides a method of determining the composition and identity of substances which may be present in a mixture. In an exemplary embodiment, the ion source of the present invention is coupled to a mass analyzer and provides a method of identifying the presence of and quantifying the abundance of analytes in liquid samples. In this embodiment, the output of the ion source is drawn into a mass analyzer to determine the mass to charge ratios (m/z) of the ions generated from dispersion of the liquid sample into droplets followed by subsequent charge reduction. In an exemplary embodiment, the ion source of the present invention is coupled to a time of flight mass spectrometer to provide accurate measurement of m/z for compounds with molecular masses ranging from about 1 to about 30,000 amu. Other exemplary embodiments include, but are not limited to, ion sources operationally coupled to quadrupole mass spectrometers, tandem mass spectrometers, ion traps or combinations of these mass analyzers. Charge reduction conditions may be systematically varied during sampling to achieve optimal mass analysis for each analyte in a complex mixture because the present invention comprises a tunable ion source capable of varying charge reduction conditions as a function of time.

Alternatively, the ion source of the present invention may be coupled to a device capable of classifying and detecting ions on the basis of electrophoretic mobility. In an exemplary embodiment, the ion source of the present invention is coupled to a differential mobility analyzer (DMA) to provide a determination of the electrophoretic mobility of ions generated from liquid samples. This embodiment is beneficial because it allows ions of the same mass to be distinguished on the basis of their electrophoretic mobility.

The ability to generate a stream of gas phase analyte ions substantially comprising singly and/or doubly charged ions significantly enhances the utility of the present invention for the identification and quantification of analytes in liquid samples. The mass spectra obtained in electrospray discharge in the absence of charge reduction typically comprise a plurality of peaks attributable to each analyte detected. In contrast, mass spectra attained for samples containing complex mixtures of oligonucleotides and/or oligopeptides employing the present invention may be greatly simplified by charge reduction to substantially comprise single or double peaks attributable to each analyte present in a liquid sample. Accordingly, charge reduced mass spectra tend to be much easier to assign and quantify by persons of ordinary skill in the art of mass spectrometry. In addition, the reduced fragmentation characteristic of the ion source of the present invention also enhances the application of the ion source for analyte identification and quantification by decreasing chemical noise and increasing the intensities of mass spectral peaks easily assignable to parent analyte species.

The present invention also comprises methods for preparing gas phase analyte ions from a liquid sample, containing chemical species in a solvent, carrier liquid or both, wherein the charge-state distribution of the gas phase analyte ions prepared may be selectively adjusted. In a preferred embodiment, the method of preparing gas phase analyte ions comprising the steps of: (1) producing a plurality of electrically charged droplets of the liquid sample in a flow of bath gas; (2) passing the flow of bath gas and droplets through a field desorption-charge reduction region of selected length, wherein at least partial evaporation of solvent, carrier liquid or both from droplets generates gas phase analyte ions and wherein the charged droplets, analyte ions or both remain in the field desorption-charge reduction region for a selected residence time; (3) exposing the droplets, gas phase analyte ions or both to electrons, reagent ions or both generated from bath gas molecules by a reagent ion source that generates an electric field, electromagnetic field or both and is surrounded by a shield element that substantially confines the electric field, electromagnetic field or both generated by the reagent ion source defining a shielded region wherein fields generated by the reagent ion source are minimized, wherein the electrons, gas phase reagent ions or both react with said droplets, charged droplets or both within at least a portion of the field desorption region to reduce the charge-state distribution of the analyte ions in the flow of bath gas thereby generating gas phase analyte ions having a selected charge-state distribution; and (4) controlling the charge-state distribution of said gas phase analyte ions by adjusting the residence time of droplets, analyte ions or both, the abundance of electrons, reagent ions, or both, the type of bath gas, the type of reagent ion or both or any combinations thereof. Optionally, to comprise a method for determining the identity and concentration of chemical species in a liquid samples, the following step may be added to those provided above; (5) analyzing said gas phase analyte ions with a charged particle analyzer.

In addition, the present invention also comprises methods of reducing the fragmentation of gas phase ions generated from electrospray discharge of liquid samples. Smith et al., Mass Spectrometry Reviews, 10, 359–451 (1991) describe the fundamental principles and methods of electrospray ionization and is incorporated in this application in its entirety by reference. A preferred method of reducing fragmentation of the present invention comprises the steps of: (1) producing a plurality of electrically charged droplets from a liquid sample in a flow of bath gas by electrospray discharge; (2) passing the flow bath gas containing the droplets through a field desorption-charge reduction region of selected length, wherein at least partial evaporation of solvent, carrier liquid or both, from droplets generates gas phase analyte ions and wherein the charged droplets, analyte ions or both remain in the field desorption-charge reduction region for selected residence time; (3) exposing the droplets, gas phase analyte ions or both to electrons, reagent ions or both generated from bath gas molecules by a reagent ion source that generates an electric field, electromagnetic field or both and is surround by a shield element that substantially confines the electric field, electromagnetic field or both generated by the reagent ion source defining a shielded region wherein fields generated by the reagent ion source are minimized, wherein the electrons, gas phase reagent ions, or both, react with the droplets, charged droplets or both, within at least a portion of the field desorption region to reduce the charge-state distribution of the analyte ions in the flow of bath gas thereby generating gas phase analyte ions having a selected charge-state distribution; and (4) controlling the charge-state distribution of said gas phase analyte ions by adjusting the residence time of droplets, analyte ions or both, the abundance of electrons, reagent ions, or both, the type of bath gas, the type of reagent ion or both or any combinations thereof.

The invention is further illustrated by the following description, examples and drawings.

BRIEF DESCRIPTION OF THE DRAWINGS

FIG. 1 shows functional block diagrams of the devices and methods of the present invention.

FIG. 3*a* shows a cross-sectional view and FIG. 3*b* shows a front view of the spray tip of the capillary.

FIG. 6 also shows positive ion mass spectra obtained with charge reduction corresponding to a variety of voltages applied to the palatinum wire electrode in the corona discharge; 6*b*=−1.25 kV, 6*c*=−1.75 kV and 6*d*=−2.00 kV.

FIG. 7 depicts the results of the use of the present invention for the analysis of a 0.5 $\mu$M equimolar mixture of protein analytes in 1:1 $H_2O/CH_3CN$ with 1% acetic acid:neurotensin (1,672.9 amu), melittin (2,847.5 amu), glucagon (3,482.8 amu), bovine insulin (5,736.6 amu), bovine ubiquitin (8,564.8 amu), equine cytochrome c (12,360) and apomyoglobin (16,951 amu).

FIG. 8 depicts the use of the present invention for the analysis of a 0.5 $\mu$M equimolar mixture of seven oligonucleotides in 1:2 $H_2O$/MeOH, 200 mM 1,1,1,3,3,3-hexafluoro-2-propanol, 15, 21, 27, 33, 39, 45 and 51 nucleotides in length.

FIG. 9 depicts the use of the present invention for the analysis of a 0.05 $\mu$L mixture of two polyethelene glycol polymer samples with average molecular weights of 2,000 Da and 10,000 Da, respectively, in a 50:50 methanol to water solution.

DETAILED DESCRIPTION OF THE INVENTION

Figure 1A:
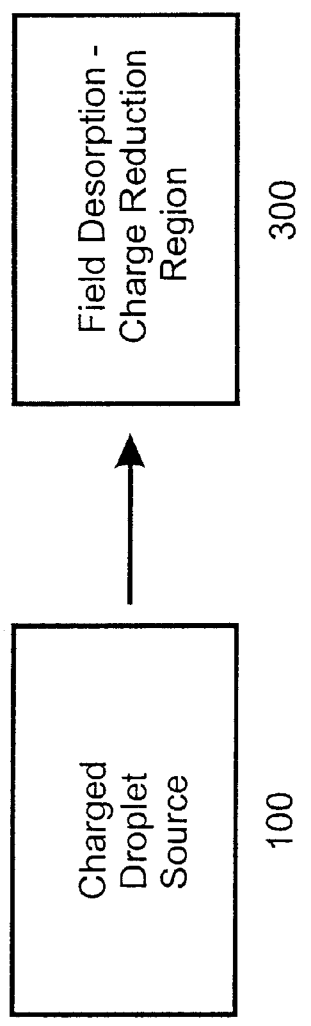
FIG. 1*a* illustrates the ion source and method of preparing ions of the present invention and FIG. 1*b* illustrates devices and methods for determining the identities and concentrations of chemical species in liquid solutions.

Referring to the drawings, like numerals indicate like elements and the same number appearing in more than one drawing refers to the same element. In addition, hereinafter, the following definitions apply:

Chemical species refers to a collection of one or more atoms, molecules and macromolecules whether neutral or ionized. In particular, reference to chemical species in the present invention includes but is not limited to polymers.

Polymer refers to chemical compounds made up of a number of simpler units, that are identical to each other or at least chemically similar, joined together in a regular way. Reference to polymers in the present invention includes but is not limited to peptides, oligonucleotides, polysaccharides, glycoproteins, lipids, copolymers, proteins and DNA.

Ions refers generally to multiply or singly charged atoms, molecules, macromolecules of either positive or negative polarity.

Reagent ions refer to a collection of gas phase ions of positive polarity, negative polarity, or both that is generated by a reagent ion source. Optionally, reagent ions may refer to free electrons in the gas phase generated by a reagent source. Reagent ions of the present invention may be singly charged, multiply charged, or both, and may be classified by their charge-state distribution. For example, $H^+$, $N_2^+$, $N_4^+$, $H_2O^+$ and $H_3O^+$ are positively charged reagent ions and $O^-$, $O_2^-$, $CN^-$, $NO_2^-$ and $OCN^-$ are negatively charged reagent ions useful in the present invention. A bipolar reagent ion gas specifically refers to a collection of reagent ions that includes both positively and negatively charged reagent ions in the gas phase.

Gas phase analyte ions refer to multiply charged ions, singly charged ions, or both, generated from chemical species in liquid samples. Gas phase analyte ions of the present invention may be of positive polarity, negative polarity or both. Gas phase analyte ions may be formed directly upon at least partial evaporation of solvent and/or carrier liquid from charged droplets or upon at least partial evaporation of solvent and/or carrier liquid from charged droplets followed by subsequent reaction with reagent ions. Gas phase analyte ions are characterized in terms of their charge-state distribution which is selectively adjustable in the present invention.

Solvent and/or carrier liquid refers to compounds present in liquid samples that dissolve chemical species and/or aid in the dispersion of chemical species into droplets. Typically, solvent and/or carrier liquid are present in liquid samples in greatest abundance.

Electrically charged droplet source refers to a device capable of dispersing liquid sample into charged droplets suspended in a flow of bath gas. Multiply charged and/or singly charged droplets ranging from approximately 0.01 to approximately 10 $\mu$m in size may be generated by droplet sources of the present invention. For example, an electrospray ionization droplet source may be used to generate droplets from liquid samples in the present invention.

Field desorption-charge reduction region refers to a region downstream of the electrically charged droplet source with respect to the flow of bath gas. Within the field desorption-charge regulation region, charged droplets are at least partially evaporated resulting in the formation of smaller charged droplets and gas phase analyte ions. In addition, reactions between reagent ions and gas phase analyte ions, charged droplets or both occur within the field desorption-charge reduction region and result in gas phase analyte ions with a selectively adjustable charge-state distribution. Typically, the field desorption-charge reduction region is within a shielded region substantially free of electric fields and/or magnetic fields generated by a reagent ion source. Further, the field desorption-charge reduction region may comprise a chamber operationally connected to a charged droplet source to allow the passage and charge reduction of analyte ions.

Liquid sample refers to a homogeneous mixture or heterogenous mixture of at least one chemical species and at least one solvent and/or carrier liquid. Commonly, liquid samples comprise liquid solutions in which chemical species are dissolved in at least one solvent.

Bath gas refers to a collection of gas molecules that aid in the formation of charged droplets and/or transport charged droplets and/or gas phase analyte ions through a field desorption-charge reduction region. Common bath gases include, but are not limited to: nitrogen, oxygen, argon, air, helium, water, sulfur hexafluoride, nitrogen trifluoride and carbon dioxide.

Smaller refers to the characteristic of occupying less volume. Typically, smaller is used in reference to smaller droplets formed upon the evaporation of droplets that occupy greater volume.

Downstream refers to the direction of flow of a stream of ions, molecules or droplets. Downstream is an attribute of spatial position determined relative to the direction of a flow of bath gas, gas phase ions and/or droplets.

Linear flow rate refers to the rate by which a flow of materials pass through a given path length. Linear flow rate is measure in units of length per unit time (typically cm/s).

Positive mode corona discharge refers to an electric discharge comprising a first electrically biased element with a positive voltage and a second element held at ground or substantially close to ground, wherein the first electrically biased element and the second element are separated by a distance close enough to create a self-sustained electrical gas discharge. When surrounded by a wire mesh shield element only positive ions are observed to substantially pass through the shield element into the field desorption-charge reduction region.

Negative mode corona discharge refers to a corona discharge comprising a first electrically biased element with a negative voltage and a second element held at ground or substantially close to ground, wherein the first electrically biased element and the second element are separated by a distance close enough to create a self-sustained electrical gas discharge. When surrounded by a wire mesh shield element only negative ions are observed to substantially pass through the shield element into the field desorption-charge reduction region.

Charged particle analyzer refers to a device or technique for determining the identity, properties or abundance of charged particles. Examples of charged particle analyzers include but are limited to mass analyzers, mass spectrometers and devices capable of measuring electrophoretic mobility such as a differential mobility analyzer.

A mass analyzer is used to determine the mass to charge ratio of a gas phase ion. Mass analyzers are capable of classifying positive ions, negative ions, or both. Examples include, but are not limited to, a time of fight mass spectrometer, a quadrupole mass spectrometer, residual gas analyzer, a tandem mass spectrometer, and an ion trap.

Residence time refers to the time a flowing material spends within a given volume. Specifically, residence time may be used to characterize the time gas phase analyte ions, charged droplets and/or bath gas take to pass through a field desorption-charge reduction region. Residence time is related to linear flow rate and path length by the following expression: Residence time=(path length)/(linear flow rate).

Shielded region refers to a spatial region separated from a reagent ion source that generates electric fields and/or electromagnetic fields by an electrically baised or grounded shield element. The extent of electric fields and/or electromagnetic fields generated by the reagent ion source in the shielded region is minimized. The shielded region may include the field desorption-charge reduction region.

Charge-state distribution refers to a two dimensional representation of the number of ions of a given elemental composition populating each ionic state present in a sample of ions. Accordingly, charge-state distribution is a function of two variables; number of ions and ionic state. Summation over all ionic states of the charge state distribution yields the total number of ions of a given elemental composition in a sample. Charge state distribution is a property of a selected elemental composition of an ion. Accordingly it reflects the ionic states populated for a specific elemental composition, as opposed to reflecting the ionic states of all ions present in a sample regardless of elemental composition.

This invention provides methods and devices for preparing ions from liquid samples containing chemical species. In particular, the present invention provides a method of generating ions highly suitable for high molecular weight compounds dissolved in liquid solutions. FIG. 1*a* is a functional block diagram depicting this embodiment of the present invention and shows a charged droplet source 100 cooperatively coupled to a field desorption-charge reduction region 300. It should be recognized that the depicted functions do not show details which should be familiar to those with ordinary skill in the art.

Figure 2:
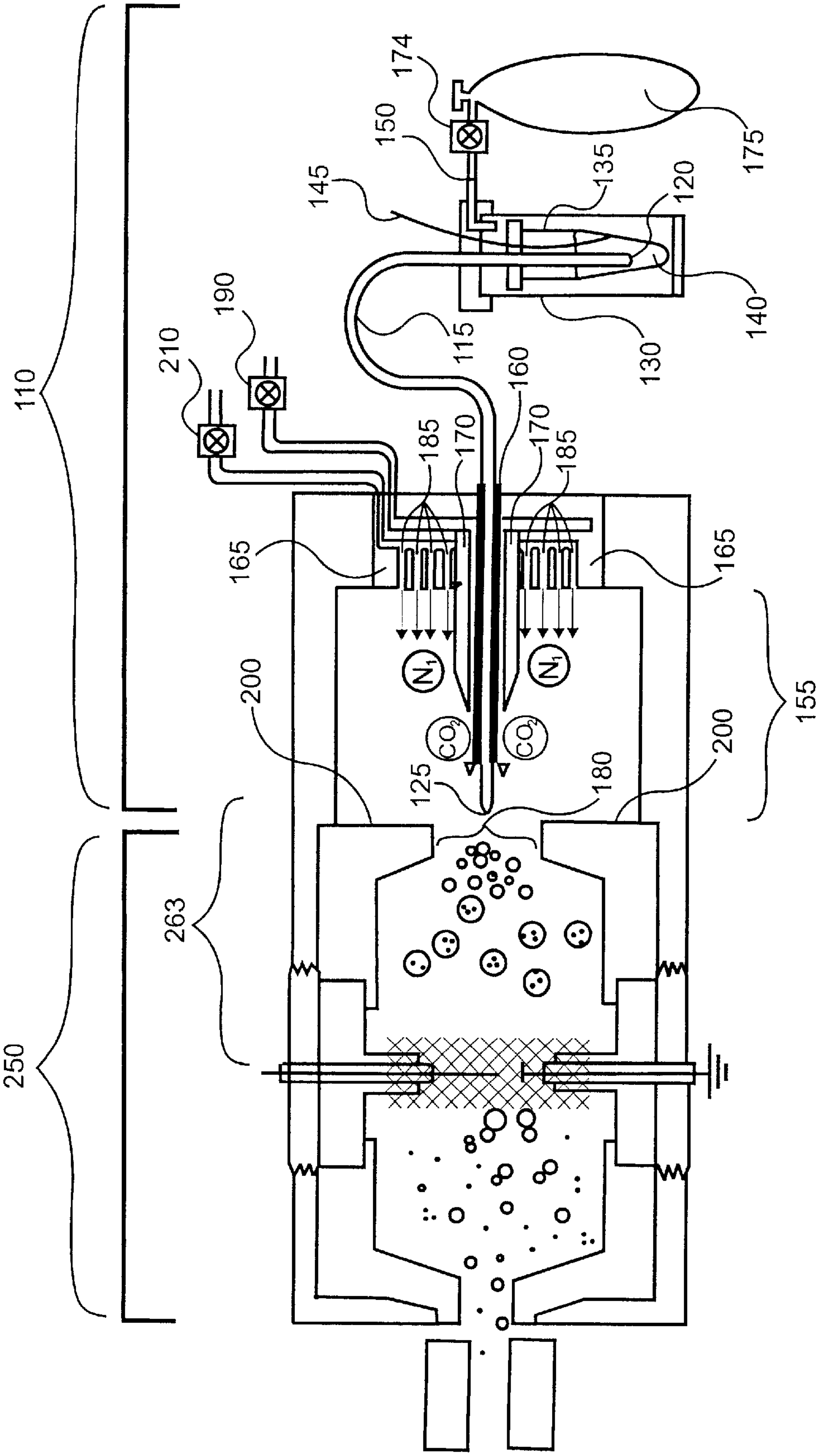
FIG. 2 shows a cross-sectional view of an exemplary ion source and an exemplary device for determining identity and concentration of chemical species in liquid solution used in the present invention.

FIG. 2 illustrates a preferred embodiment of the invention in which the charged droplet source comprises a positive pressure electrospray ionization source 110. The illustrated electrospray ionization 110 source consists of a 24 cm long fused-silica polyimide coated capillary 115 having an inlet 120 at one end and a spray tip 125 at the other end. In a preferred embodiment, the polyimide-coated capillary 115 has a 150 μm outer diameter and a 25 μm inner diameter. The inlet end of the capillary is placed in contact with a liquid sample 140 containing analyte in solvent and or carrier liquid which is stored within a polypropylene vessel 135. In a preferred embodiment, polypropylene vessel 135 has a volume of 0.5 ml. Polypropylene vessel 135 also houses a platinum electrode 145 which is immersed into liquid sample 140. Sample pressure vessel 130 houses the polypropylene vessel and is equipped with pressure inlet 150 operationally connected to pressurized gas cylinder 175 via pressure controller 174. Pressurization of polypropylene vessel 135 allows for liquid sample to be conducted through polyimide-coated capillary 115.

Figure 3A:
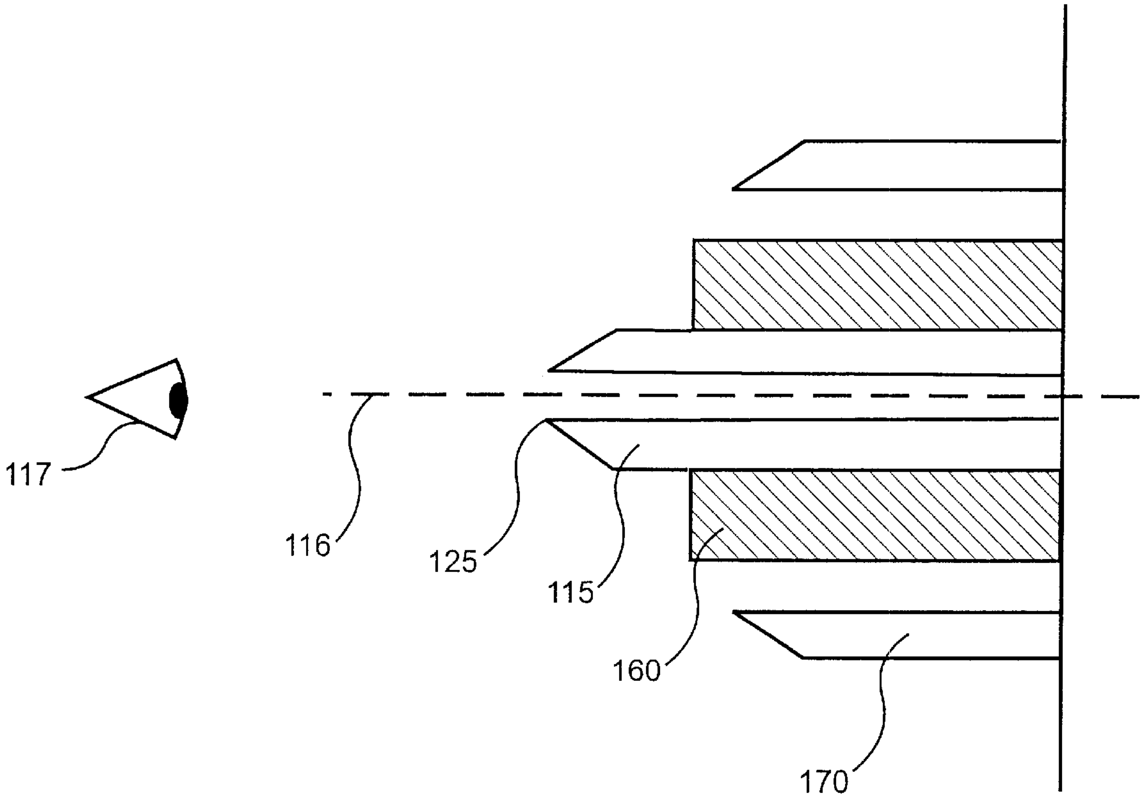
FIGS. 3*a* and 3*b* show the spray tip of a capillary used in a charged droplet source of the present invention.
Figure 3B:
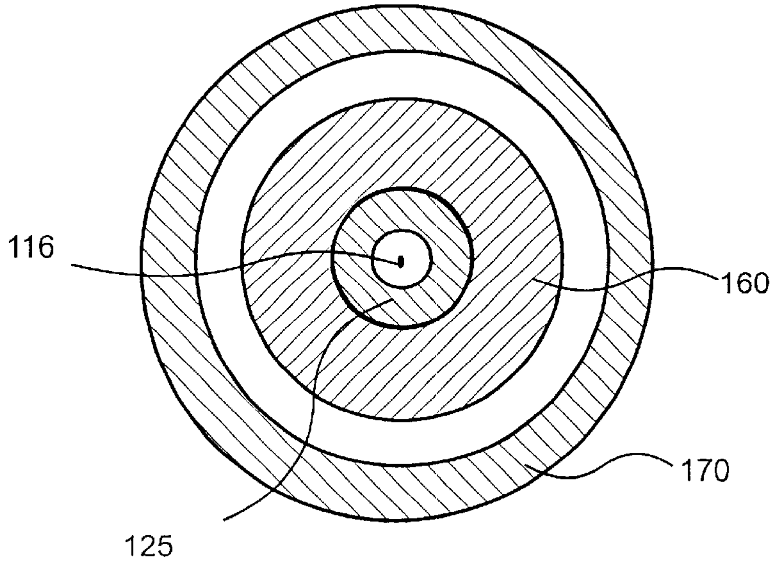

FIG. 3*a* illustrates an enlarged schematic of the spray tip end 125 of fused silica polyimide coated capillary 115. As shown in FIG. 3*a*, the spray tip 125 of fused silica capillary 115 is conically ground. In a preferred embodiment, spray tip 125 is conically ground to achieve a cone angle ranging from 20–40 degrees to form a nebulizer. In a more preferred embodiment, spray tip 125 is conically ground to achieve a cone angle of approximately 35 degrees. The cone angle is defined as the angle between capillary axis 116 and the cone surface. FIG. 3*b* shows a front view of spray tip 125 of positive pressure electrospray ionization source 110 as viewed from viewpoint 117 along capillary axis 116. As apparent to anyone of ordinary skill in the art, a conically ground, capillary electrospray nebulizer is just one type of nebulizer useable in the present invention. Accordingly, the scope of the present invention encompass other geometries and types of nebulizers known in the art.

Referring again to FIG. 2, spray tip 125 of the fused silica capillary 115 is cooperatively connected to an electrospray manifold 165 comprising one end of a cylindrical electrospray chamber 155. Fused silica capillary 115 is held in place by a stainless steel support tube 160 concentric to the capillary which passes through electrospray manifold 165 and extends approximately 2 mm into electrospray chamber 155. Fused silica capillary 115 is positioned such that spray tip 125 extends past the end of stainless steel support tube 160 within electrospray chamber 155. In a preferred embodiment, the fused silica capillary is operationally connected to electrospray manifold 165 in a fashion that provides adjustable positioning with respect to the distance that the fused silica capillary extends into electrospray chamber 155. Both capillary 115 and support tube 160 pass through a central orifice in electrospray manifold 165 and are held in place by a cylindrical, stainless steel sheath tube 170 that is concentric with both the capillary and support tube. Spray manifold 165 is also equipped with a plurality of bath gas outlets 185 surrounding the central orifice into which the fused silica capillary 115 is positioned. As shown in FIG. 2, the electrospray chamber 155 further includes a metal plate 200 with an orifice 180 positioned directly opposite to spray manifold 165. Metal plate 200 is able to be electrically biased and in a preferred embodiment is held near ground. In a more preferred embodiment, metal plate 200 is held at about 250 V or about −250 V.

In the embodiment depicted in FIGS. 2 and 3, liquid sample 140 is forced through polyimide-coated capillary 115 into electrospray chamber 165 held at near atmospheric pressure. Typical liquid flow rates through capillary 115 range from about 0.05 to about 2 μl/min and are achieved by applying a positive pressure through pressure controller 174 from pressurized gas cylinder 175 to pressure inlet 150 of sample pressure vessel 135. Pressure controller 174 is adjustable over the range of about 0.1 to about 20 psi to provide control over the liquid flow rate through capillary 115. Liquid sample 140 is maintained at a high electric potential, ranging from about −10 kV to about 10 kV, by means of platinum electrode 145. In a preferred embodiment, the liquid sample is maintained at a potential equal to approximately 4500 V or approximately −4500 V. Positive electric potentials are employed to generate positively charged droplets and negative electric potentials are used to generate negatively charged droplets. The potential difference between spray tip 125 and metal plate 200 creates an electric field at the surface of the liquid solution emerging from spray tip 125, dispersing it into a fine spray consisting of a flowing stream of charged droplets containing analyte. The spray is stabilized against corona discharge by a flow of $CO_2$ or some other electron scavenging gas at a rate of approximately 1 L/min through stainless steel sheath tube 170 which is controlled by flow controller 190. Flow controller 190 is configured to provide adjustable control of the flow rate of $CO_2$ through sheath tube 170. Upon passing through flow controller 210, bath gas, typically $N_2$ or medical air, are flowed into the electrospray chamber through the plurality of outlets 185 cooperatively connected to electrospray manifold 165. In a preferred embodiment, bath gas is substantially dry to initiate evaporation of solvent and/or carrier liquid in the electrospray chamber and/or the field desorption-charge reduction region.

In a preferred embodiment, polyimide-coated capillary 115 is cooperatively coupled to the output of an on-line liquid phase separation apparatus for sample introduction. This arrangement provides sample separation and/or purification prior to introduction into the positive pressure electrospray apparatus. Prior separation based on adsorption, analyte affinity, molecular exclusion and/or ion exchange are all encompassed within the scope of the present invention. Acceptable on-line liquid phase separation techniques include but are not limited to capillary electrophoresis, microfiltration, super critical fluid chromatography, high performance liquid chromatography, and other liquid phase chromatography techniques.

It should be recognized by anyone of ordinary skill in the art of field desorption ion sources that the electrospray ionization source depicted in FIG. 2 is but one means employable for the generation of electrically charged droplets. Accordingly, it is to be recognized that droplet sources other than electrospray ionization sources may be used to generate a stream of charged droplets in the present invention. Alternative charged droplet sources include, but are not limited to, the use of nebulizers, ultrasonic nebulizers, pneumatic nebulizers, piezoelectric nebulizers, thermospray vaporizers, cylindrical capacitor electrospray sources, and atomizers.

Upon formation, the charged droplets are entrained into a stream of bath gas flowing through the plurality of orifices 185 in the spray manifold. In a preferred embodiment, the flow of bath gas ranges from about 1 to about 10 L/min. In addition to being conducted by the flow of bath gas, the stream of droplets are attracted to metal plate 200 due to their electric charge. The flow of bath gas promotes evaporation of solvent and/or carrier liquid from the charged droplets and also directs the droplets toward small orifice 180. Optionally, electrospray chamber 155 and field desorption-charged reduction chamber 250 may be heated to aid in evaporation of solvent and/or carrier liquid from the droplets. As a consequence of at least partial evaporation of solvent and/or carrier liquid, the droplets shrink and develop increased charge density on their surfaces. Eventually the charge density on the droplet surface reaches the Rayleigh limit at which point repulsive Coulombic forces approach the magnitude of droplet cohesive forces (i.e surface tension). The resulting instability leads to droplet fission whereby the primary droplets divide into smaller daughter droplets with decreased surface charge densities. Daughter droplets undergo subsequent solvent evaporation, reach their Rayleigh limits and give way to even smaller charged droplets. It is believed that the droplets successively disintegrate until the analyte molecules contained in the droplets are desorbed into the gas phase. Accordingly, solvent evaporation initiates a cascade of droplet fission and ion desorption processes that generate a stream of charged droplets and gas phase analyte ions of either positive or negative polarity.

Figure 4:
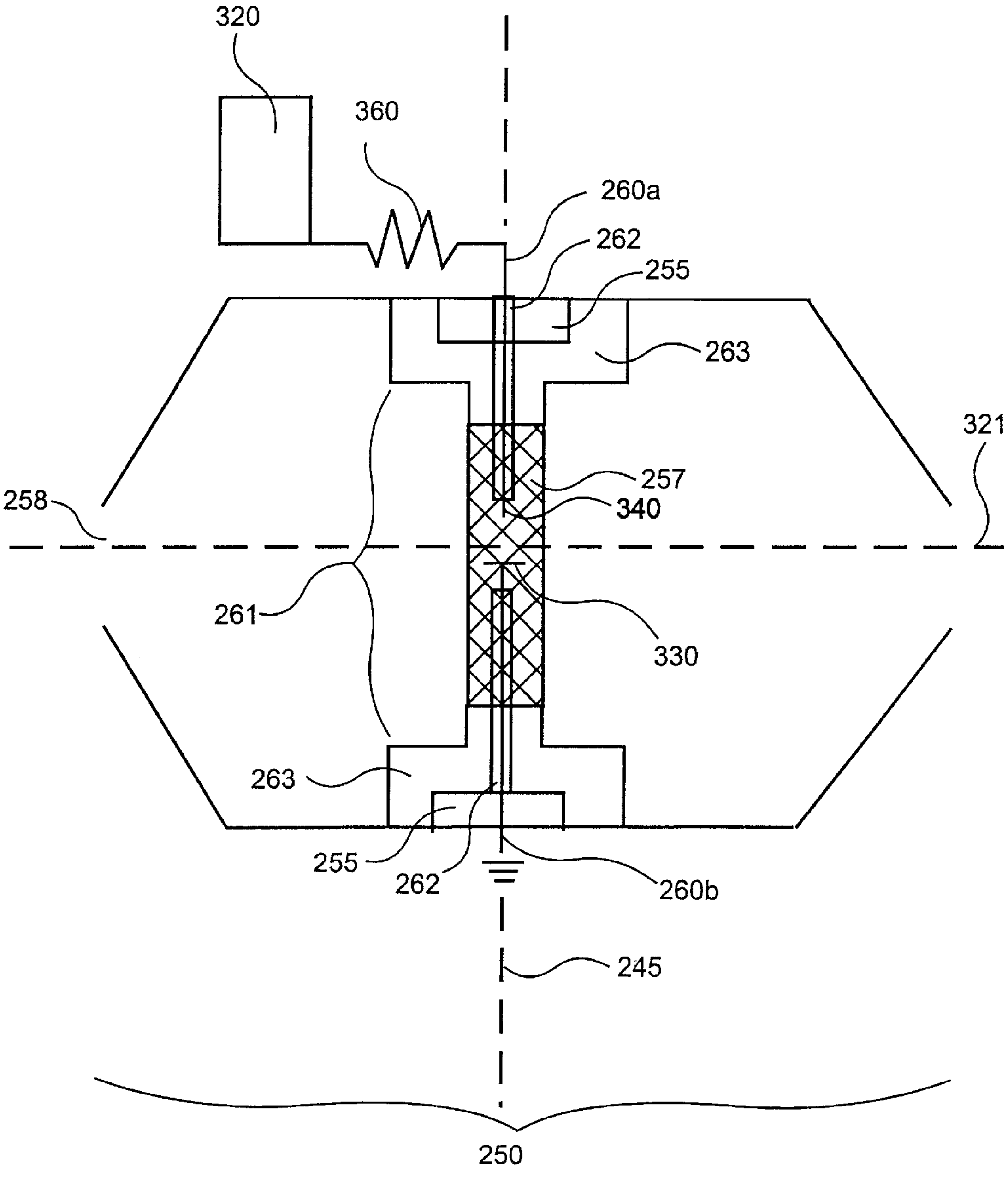
FIG. 4 shows an expanded view of the charge reduction chamber of an ion source of the present invention.

Flows of bath gas ranging from about 1 to about 10 L/min., carry the stream of charged particles and gas phase analyte ions downstream past orifice 180 through field desorption-charge reduction region 300. The flow of bath gas is adjustable by flow controller 210. This flow rate determines the rate of movement of the droplets and gas phase analyte ions through field desorption-charge reduction region 300. In preferred embodiments shown in FIG. 2 and FIG. 4, field desorption-charge reduction region 300 is a cylindrical field desorption-charge reduction chamber 250, which is insulated from spray tip 125 by a Teflon coating. In a more preferred embodiment, field desorption-charge reduction chamber 250 has a diameter of 1.9 cm and a length of 4.3 cm. As depicted in FIGS. 2 and 4, charge reduction chamber 250 houses a corona discharge 261 and a shield element 257. Corona discharge 261 comprises two electrodes; corona discharge element 260*a* and corona discharge element 260*b* and is positioned approximately 2 cm downstream from spray tip 125. Additionally, field desorption-charge reduction chamber 250 possesses exit orifice 258.

FIG. 4 shows an enlarged schematic of field desorption-charge reduction chamber 250. In this embodiment, charge reduction chamber 250 has two 31 mm diameter holes situated in the top and bottom of the center of the cylinder and casing, into which aluminum disks 255 are inserted. Corona discharge elements 260*a* and 260*b* are housed within glass capillaries 262 and are operationally inserted, along the corona discharge axis 245, through aluminum disks 255 and chamber housing sheaths 263 into the volume of field desorption-charge reduction chamber 250. In a preferred embodiment, corona discharge elements 260*a* and 260*b* are operationally connected in a manner to provide independent control of the lengths that each element extend inside the volume of field desorption-charge reduction chamber 250. Ability to control the lengths that each element extend into the chamber provides a means of adjusting the distance between elements 260*a* and 260*b* (the gap width) which in part governs the rate of electron production and/or reagent ion production of the discharge. As evident to one of ordinary skill in the art of ion sources, aluminum disks 255, housing sheaths 263 and corona discharge elements 260*a* and 260*b* may be positioned at any point along the central chamber axis 321 that runs orthogonal to corona discharge axis 245. In a preferred embodiment, corona discharge 261 is positioned far enough downstream of said charged droplet source to allow substantial field desorption of said chemical species from said charged droplets. Accordingly, the present invention includes embodiments in which the distance from the droplet source and the corona discharge, distance 263, are selectively adjustable.

The first corona discharge element 260*a* is electrically baised and is connected to high voltage power supply 320. The second corona discharge element 260*b* is held at ground or substantially close to ground. In a preferred embodiment, high voltage power supply 320 has a variable voltage output over the range of approximately +10,000 volts to approximately −10,000 volts. In a more preferred embodiment, the output of high voltage power supply 320 is approximately 2,000 volts or approximately −2,000 volts.

In the preferred embodiment depicted in FIG. 4, corona discharge elements are arranged in the point to plane geometry. Corona discharge element 260*a* comprises a 0.5 mm diameter platinum wire ground to a 10 $\mu$m radius point 340. Corona discharge element 260*b* comprises a stainless steel wire with a flat stainless steel disc 330 that terminates within the volume of field desorption-charge reduction chamber 250 directly opposite radius point 340. In a preferred embodiment, flat stainless steel disc 330 has a diameter of approximately 6.4 mm and the distance between corona discharge elements along corona discharge axis 245, called the gap width, is adjustable over the range of approximately 0.1 mm to approximately 30 mm by sliding the platinum wire within glass capillary 262. In a more preferred embodiment, the gap width ranges from approximately 2 mm to approximately 4 mm. It is to be recognized by anyone of ordinary skill in the art that the present invention encompasses corona discharge orientations other than the point to plane geometry depicted in FIG. 4.

In the preferred embodiment depicted in FIG. 4, corona discharge element 260*a* is connected to high voltage power supply 320 through a 22.5 megaohm current limiting resistor 360. High voltage power supply 320 is configured in a manner to provide either positive or negative voltages to corona discharge element 260*a*, depending on the desired corona mode. The corona discharge depicted in FIGS. 2 and 4 is operational in both positive and negative modes. Positive mode corona discharge refers to an electric discharge comprising a first electrically biased element with a positive voltage and a second element held at ground or substantially close to ground, wherein the first electrically biased element and the second element are separated by a distance close enough to create a self-sustained electrical gas discharge. Negative mode corona discharge refers to a corona discharge comprising a first electrically biased element with a negative voltage and a second element held at ground or substantially close to ground, wherein the first electrically biased element and the second element are separated by a distance close enough to create a self-sustained electrical gas discharge.

Operation of the corona discharge in both positive and negative modes results in ejection of electrons from bath gas molecules which produces negatively charged ions. Ejected electrons interact with other bath gas molecules to generate positively and negatively charged reagent ions. Corona discharge 261 is surrounded by a shield element 257 that is cooperatively connected to housing sheaths 263. The shield element 257 may be held at ground or held at a fixed electric potential. In a preferred embodiment, shield element 257 is held at an electric potential that is substantially close to ground. In the preferred embodiment depicted in FIG. 4, shield element 257 is held at the same electric potential as field desorption-charge reduction chamber 250, typically about 250 V or −250 V, because housing sheaths 263 are in electrical contact with the charge reduction chamber 250.

In a preferred embodiment, shield element 257 forms a Faraday cage surrounding corona discharge 255 that substantially confines the electric fields generated by corona discharge element 260*a* and allows passage of at least some reagent ions into the field desorption-charge reduction region. In this way the shield element functions to restrict the spacial characteristics of electric fields generated by the corona discharge. In a preferred embodiment, shield element 257 is a cylindrical wire mesh screen with a length of approximately 2 cm and a radius of approximately 1 cm that is in electrical contact with field desorption-charge reduction chamber 250 via physical attachment to chamber housing sheaths 263. While the corona discharge generates both positively and negatively charged ions when operating in either positive or negative modes, experiments have shown that only negatively charged ions are passed into the field desorption-charge reduction region when operating in negative mode and only positively charged ions are passed into the field desorption-charge reduction region when operating in positive mode. It is believed this is due to the effect of electric fields generated by the electric potential applied to corona discharge element 260*a*.

Within the volume of the field desorption-charge reduction region, analyte ions and/or charged droplets interact with electrons and/or reagent ions of opposite polarity. Upon desorption from the charge droplets, analyte ions typically possess a charge state distribution centered around a highly multiply charged state. However, the charge-state distribution of gas phase analyte ions is reduced upon interaction with reagent ions in the field desorption-charge reduction region. Specifically, ion-ion chemical reactions in the field desorption-charge reduction region between gas phase analyte ions and oppositely charged reagent ions result in a shift in the charge state distribution of the analyte ions from highly charged states to lower charged states. In a preferred embodiment, the extent of this charge reduction is selectively adjustable. Accordingly, multiply charged analyte ions lose charge upon passing through field desorption-charge reduction chamber 250 and ultimately reach their final charge state distribution inside the chamber that reflects the charge-state distribution of the gas phase analyte ions that comprise the output of the ion source.

Several factors govern the charge-state distribution of the analyte ions exiting the ion source of the present invention and, hence, influence the extent of charge reduction achieved. First, the voltage applied to corona discharge element 260*a*, for a given gap spacing, governs the rate at which electrons and/or reagent ions are generated and consequently the concentration of reagent ions in the field desorption-charge reduction chamber. This concentration in turn determines the rate of reaction of reagent ions with gas phase analyte ions within the field desorption-charge reduction chamber. Second, the residence time of the analyte ions and/or droplets in the field desorption-charge regulation region affects the charge reduction achieved. Residence time is determined by the linear flow rate through the field desorption-charge reduction chamber and the length and/or physical dimensions of the chamber itself. Longer residence times correspond to a greater extent of charge reduction experienced and a shorter residence time corresponds to a lesser extent of charge reduction achieved. Third, the charge-state distribution of the gas phase reagent ions may also affect the extent of charge reduction experienced. As all of these factors are controllable by either varying the voltage output of high voltage power supply 320, adjusting the bath gas flow rate via flow controller 210 and/or changing the length and/or physical dimensions of the field desorption-charge reduction region, the present invention provides tuneable charge reduction. For example, a greater degree of charge reduction may be attained by operating the corona discharge at higher potential differences and/or by reducing the linear flow velocity of gas through the field desorption-charge reduction chamber.

Experiments have shown that by selection of the proper corona discharge voltages and/or linear flow velocities it is possible to achieve an output of gas phase analyte ions that is predominantly singly and/or doubly charged ions. Decreasing the population of analyte ions in highly multiply charged states has the benefit of reducing the occurrence of fragmentation inherently associated with parent ions generated by electrospray discharge. Accordingly, the present invention constitutes an ion source capable of preparing charge reduced analyte ions with minimal analyte ion fragmentation.

Due to its tuneability feature, the present invention may be operated in either a constant voltage or continuous scanning voltage modes. Constant voltage operation corresponds to a configuration in which the voltage applied to corona discharge element 260*a* is set to a desired level and maintained at a constant value during sampling. For example, once the voltage providing primarily singly or doubly charged charge-reduced analyte ions is determined, the apparatus may be set to this constant voltage to obtain an ion output with a constant charge-state distribution centered around a charge-state of +1 or +2. In contrast, when operating the present invention in a continuous scanning voltage mode, the voltage applied to corona discharge element 260*a* is continuously scanned during sampling in either positive or negative voltage directions. Accordingly, the ion output achieved in this configuration possesses a charge-state distribution that may vary as a function of time. Operating the present invention in a continuous scanning voltage mode maybe useful when analyzing a mixture of analytes in which the various gas phase analyte ions corresponding to different types of analytes require different charge reduction conditions to achieve populations centered around singly and/or doubly charged states.

As evident to anyone of ordinary skill in the art of ion sources, the present invention may also be used to generate ions from gas phase neutrals generated by electrospray discharge or other discharge methods. For example, non-polar species and slightly polar species generally do not undergo field desorption into the gas phase upon electrospray discharge. However, such neutral species may be released to the gas phase by complete removal of the solvent via evaporation. Thus, the present method of charge reduction may be directly used to ionize such neutral, gas phase chemical species prepared by discharge methods. Accordingly, the present invention includes methods and devices for preparing ions from neutrals and controlling the resulting charge-state distribution of the ions formed. As evident to persons of ordinary skill in the art, the application of the present invention to ionize neutrals may also be applied to droplet sources that generate predominantly neutral droplets.

The present invention also includes embodiments that utilize reagent ion sources able to supply both positive and negatively charged reagent ions to the field desorption charge reduction region. In a preferred embodiment, the source of reagent ions comprises two adjacent corona discharges each oriented in the point-plane geometry operating in opposite corona discharge modes. In this embodiment, two discharges operating in opposite modes are each individually surrounded by a wire mesh shield and positioned adjacent to each other down stream of the charged drolet source. Accordingly, this embodiment provides a source of positively charged and negatively charged ions simultaneously to the field desorption-charge reduction region. This preferred embodiment allows charge reduction of either positively charged or negatively charged gas phase analyte ions without changing the corona discharge characteristics. In addition, this preferred embodiment is expected to yield improved net reagent ion output because analyte ions that undergo complete neutralization are able to be recharged prior to exiting the field desorption-charge reduction region. Further, this embodiment provides greater control over the charge-state distributions attained for a given discharge because it provides independent control over each corona discharge voltage which in turn provides independent control of both positively and negatively charged reagent ion concentrations. As evident to one of ordinary skill in the art, the reagent ion source of the present invention may also comprise a plurality of corona discharges greater than two wherein at least one corona discharge is operating in positive corona discharge mode and at least one corona discharge is operating in negative corona discharge mode.

In another embodiment, similar bipolar reagent ion characteristics are attained using a radio frequency (RF) corona discharge. In this embodiment, an RF corona discharge oriented in the point-plane geometry is surrounded by a wire mesh screen. The RF corona discharge is positioned down stream of the charged droplet source and the voltage applied to the discharge is oscillated between positive and negative electric potentials. Scanning the voltage applied to the corona discharge between positive and negative potential differences allows both positive and negative ions to enter the field desorption-charge reduction region and interact with gas phase analyte ions in a periodic manner.

It should be recognized by anyone of ordinary skill in the art of ion sources that the corona discharge configurations described are but one means employable for the generation of positively or negatively charged reagent ions from bath gas molecules. Accordingly, it is to be understood that any other means of generating reagent ions may be substituted for the corona discharge sources described in the present invention. Alternative reagent ion sources include, but are not limited to, plasma ion sources, thermionic electron guns, microwave discharges, inductively coupled plasma sources, lasers and other sources of electromagnetic radiation and radioactive ion sources.

Figure 1B:
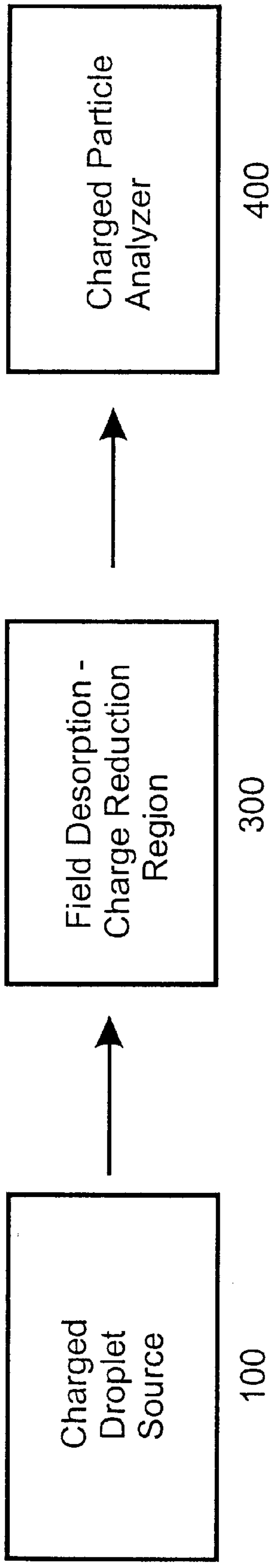

The claimed inventions also provide methods and devices for identifying the presence of and quantifying the abundance of chemical species in liquid samples. FIG. 1*b* depicts an embodiment in which charged droplet source 100 and field desorption-charge reduction region 300 are cooperatively coupled to charged particle analyzer 400. It should be recognized that the depicted functions do not show details which should be familiar to those with ordinary skill in the art.

Figure 5:
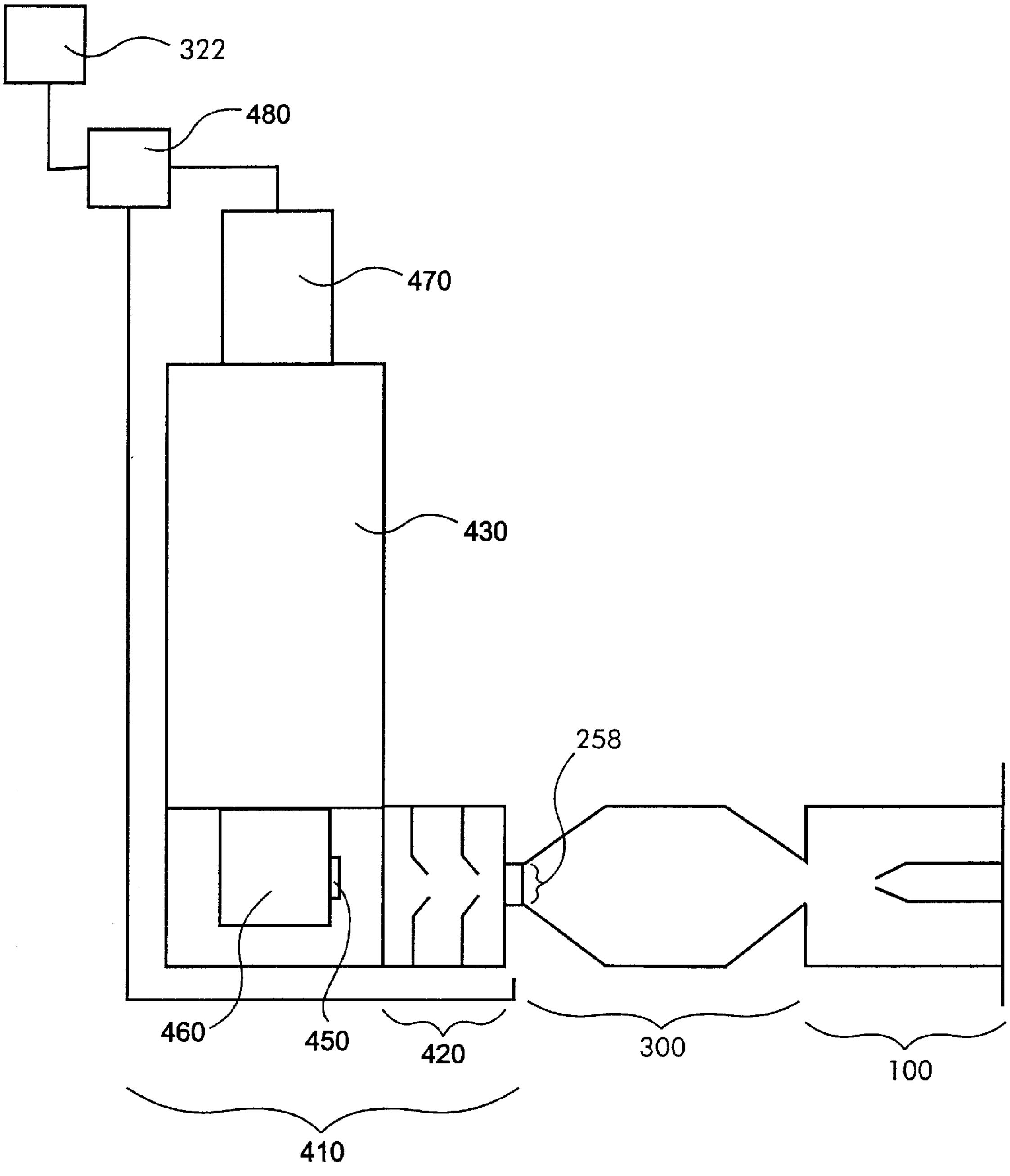
FIG. 5 is a schematic drawing of an ion source of the present invention coupled to a time of flight mass spectrometer for determining the identity and concentration of chemical species in liquid solutions.

FIG. 5 depicts a preferred embodiment in which gas phase analyte ions exit a field desorption-charge reduction region 300 through outlet 258 and a portion is drawn into a mass analyzer. In the preferred embodiment shown in FIG. 5, a portion of the flow of gas phase analyte ions is drawn into the entrance nozzle of an orthogonal time of flight mass spectrometer 410 held equipotential to the field desorption-charge reduction region. In a more preferred embodiment the mass analyzer is a commercially available PerSeptive Biosystems Mariner orthogonal TOF mass spectrometer with a mass to charge range of approximately 25,000 m/z and an external mass accuracy of greater than 100 ppm. The orthogonal time of flight mass spectrometer 410 is interfaced with the charge reduction chamber through a plurality of skimmer orifices 420 that allow the transport of gas phase analyte ions from atmospheric pressure to the high vacuum ($<1\times10^{-3}$ Torr) region of the mass spectrometer. In a preferred embodiment, the nozzle of the mass spectrometer is held around 175° C. to ensure all particles entering the mass spectrometer are well dried. Optionally, a quadrupole chamber can be cooperatively coupled to the mass spectrometer to provide collisional cooling prior to passage to drift tube 430.

The gas phase analyte ions are focused and expelled into a drift tube 430 by a series of ion optic elements 450 and pulsing electronics 460. The arrival of ions at the end of the drift tube is detected by a microchannel plate (MCP) detector 470. Although all gas phase ions receive the same kinetic energy upon entering the drift tube, they translate across the length of the drift tube with a velocity inversely proportional to their individual mass to charge ratios (m/z). Accordingly, the arrival times of singly charged gas phase analyte ions at the end of the drift tube are separated in time according to molecular mass. Accordingly, the capability of the present ion source to generate an output substantially consisting of singly charged ions makes it highly compatible with detection and analysis by time of flight mass spectrometry. The output of microchannel detector 470 is measured as a function of time by a 1.3 GHz time-to-digital converter 480 and stored for analysis by micro-computer 322. By techniques known in the art of time of flight mass spectrometry, flight times of gas phase analyte ions are converted to molecular mass using a calibrant of known molecular mass.

It should be recognized that the method of ion production, classification and detection employed in the present invention is not limited to analysis via TOF-MS and is readily adaptable to virtually any mass analyzer. Accordingly, any other means of determining the mass to charge ratio of the gas phase analytes may be substituted in the place of the time of flight mass spectrometer. Other applicable mass analyzers include, but are not limited to, quadrupole mass spectrometers, tandem mass spectrometers, ion traps, and magnetic sector mass analyzers. However, an orthogonal TOF analyzer is preferred because it is capable of measurement of m/z ratios over a very wide range that includes detection of singly charged ions up to approximately 30,000 Daltons. Accordingly, TOF detection is well-suited for the analysis of ions prepared from liquid solution containing macromolecule analytes such as protein and nucleic acid samples.

It should also be recognized that the ion production method of the present invention may be utilized in sample identification and quantitative analysis applications employing charged particle analyzers other than mass analyzers. Ion sources of the present invention may be used to prepare ions for analysis by electrophoretic mobility analyzers. In an exemplary embodiment, a differential mobility analyzer is operationally coupled to the field desorption-charge reduction region to provide analyte ion classification by electrophoretic mobility. In particular, such applications are beneficial because they allow ions of the same mass to be distinguished on the basis of their electrophoretic mobility.

Further, the present devices and ion production methods may be used to prepare analyte molecules for coupling to surfaces and/or other target destinations. For example, surface deposition may be accomplished by positioning a suitable substrate downstream of the field desorption-charge reduction region in the pathway of the stream of gas phase analyte ions. The substrate may be grounded or electrically biased whereby gas phase analyte ions are attracted to the substrate surface. In addition, the stream of gas phase ions may be directed, accelerated or decelerated using ion optics known by persons of ordinary skill in the art. Upon deposition, the substrate may be removed and analyzed via surface and/or bulk sensitive techniques such as atomic force microscopy, scanning tunneling microscopy or transmission electron microscopy. Similarly, the present devices and ion preparation methods may be used to introduce chemical species into cellular media. For example, charged oligopeptides and/or oligonucleotides prepared by the present methods may be directed toward cell surfaces, accelerated or decelerated and introduced into one or more target cells by ballistic techniques known to those of ordinary skill in the art.

The present invention provides a means for generating ions from liquid solutions that provides adjustable control of charge-state distribution. The invention provides an exemplary ion source for identification and/or quantification of high molecular weight chemical species contained in liquid samples via analysis with a mass analyzer or any equivalent charged particle analyzer. In addition, the present invention provides an exemplary ion source for preparing an ion beam suitable for surface deposition and/or bombardment. These and other variations of the present ion source are within the spirit and scope of the claimed invention. Accordingly, it must be understood that the detailed description, preferred embodiments and drawings set forth here are intended as illustrative only and in no way represent a limitation on the scope and spirit of the invention.

EXAMPLE 1

Analysis of Protein Containing Samples

Figure 6A:
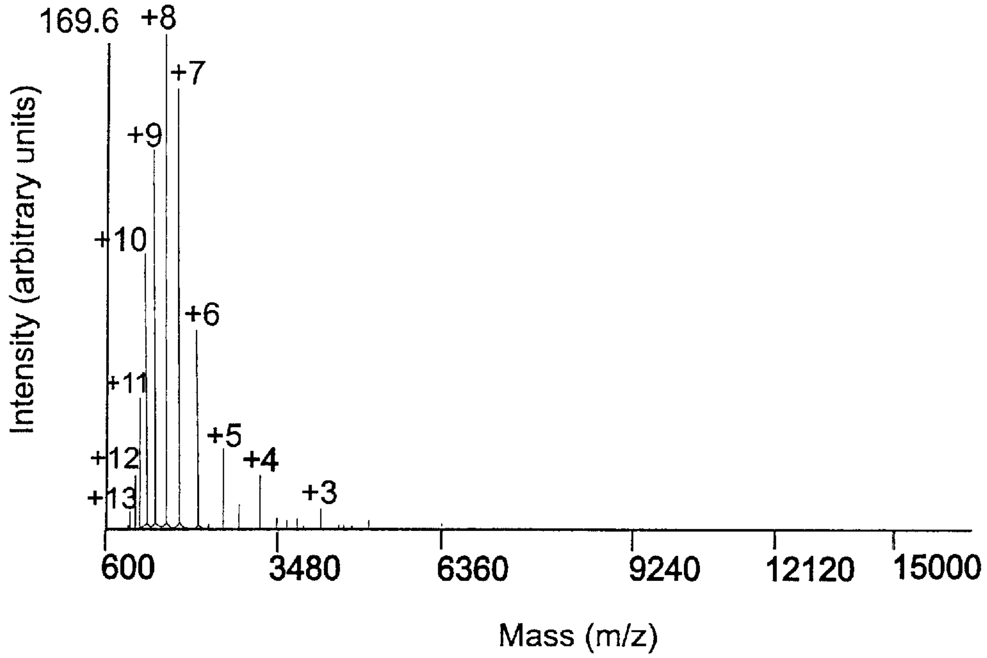
FIG. 6*a* shows a positive ion mass spectrum obtained from the electrospray ionization of a 5 $\mu$M solution of the protein cytochrome c with no charge reduction.
Figure 6B:
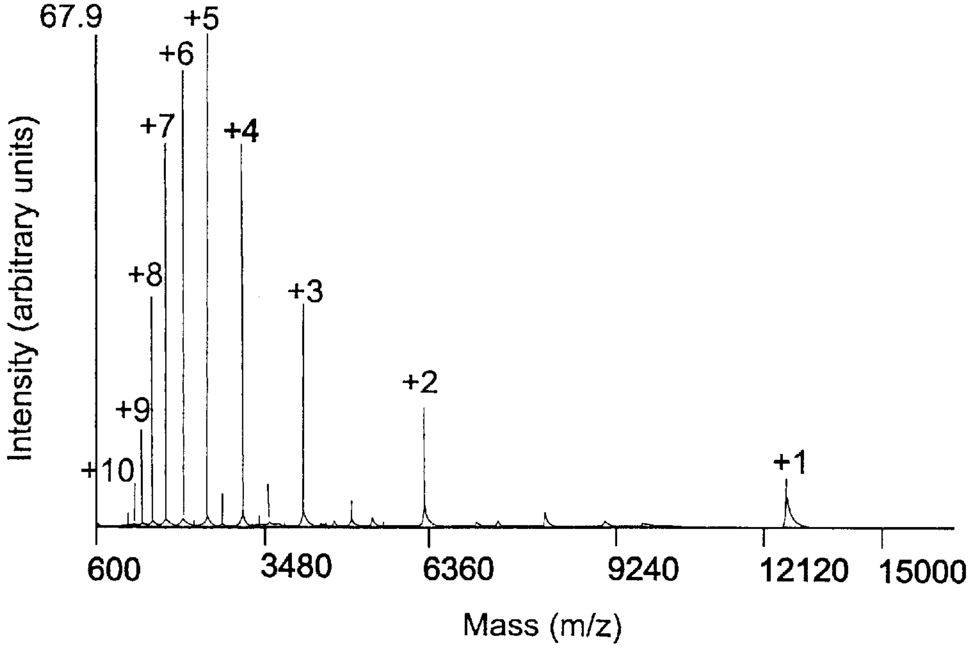
FIG. 6 illustrates application of the present invention to the detection of protein analytes.
Figure 6C:
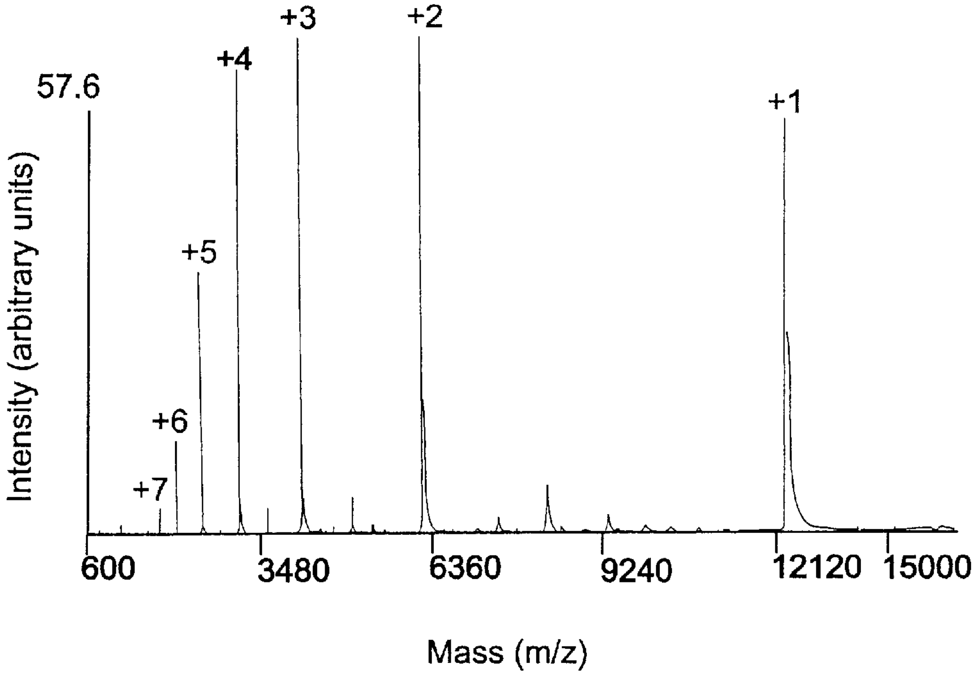
Figure 6D:
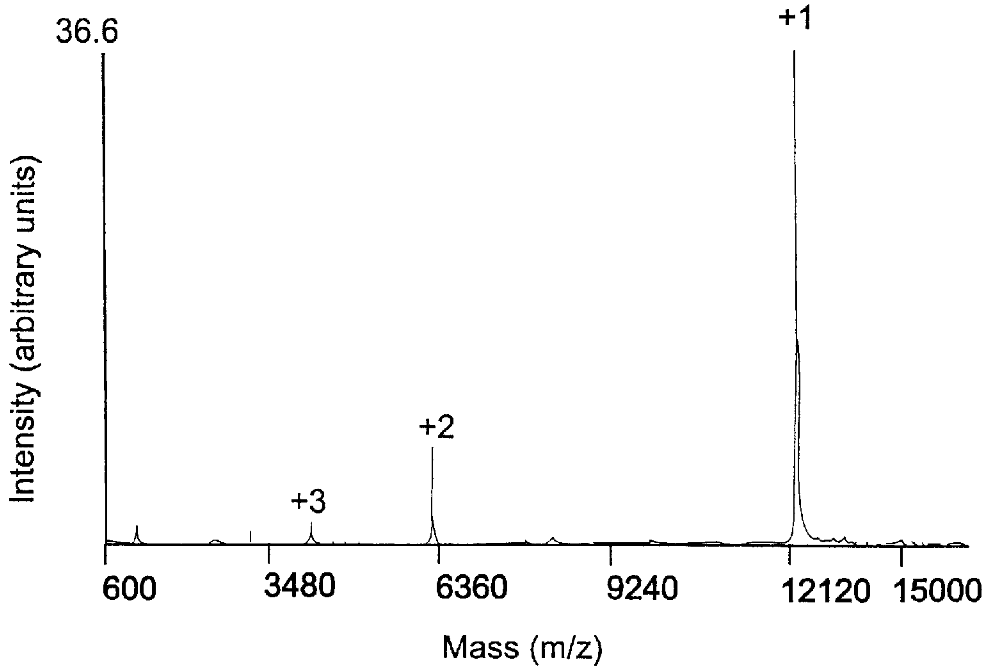

The use of the present invention for the detection and quantification of protein analytes was tested by analyzing liquid solutions containing known quantities of protein analytes using charge reduction techniques with electrospray ionization-time of flight mass spectrometry (ES-TOF/IMS). Specifically, FIG. 6 presents a series of positive ion mass spectra observed upon electrospray discharge of 5 $\mu$M liquid solution of the protein cytochrome c (MM=12,360 amu) in 1:1 $H_2O/CH_3CN$ with 1% acetic acid which corresponds to varying degrees of charge reduction using a corona discharge. Tuning of the charge-state distribution was achieved by adjusting the voltage applied to a corona discharge configured in a point to plane geometry operating in negative mode. The averaged mass spectra shown represent experimental conditions of a 250 s sampling interval at a spectral acquisition rate of 10 kHz. Each run consumed 0.71 $\mu$l and the spectra shown are the result of smoothing the raw spectrum by a convolution with a Gaussian function. As shown in FIG. 6*a*, a spectrum was obtained that is characterized by a plurality of ionic states ranging from +3 to +13 with no voltage applied to the corona discharge. This spectrum indicates a large number of populated charge states and is a typical ES-MS spectrum. FIG. 6 also shows spectra corresponding to a variety of voltages applied to the corona discharge, 6*b*=−1 kV, 6*c*=−1.25 kV, 6*d*=−1.75 kV. As evident in FIGS. 6*b*–*d*, increasing the voltage applied to the corona discharge resulted in spectra that exhibit fewer populated charge states and lower charge states. At a voltage of −1.75 kV (FIG. 6*d*) predominantly singly charged species are observed. This result demonstrates the feasibility of obtaining easy to interpret ES-TOF/MS spectra consisting of a single major peak corresponding to a given protein analyte of interest.

Figure 7A:
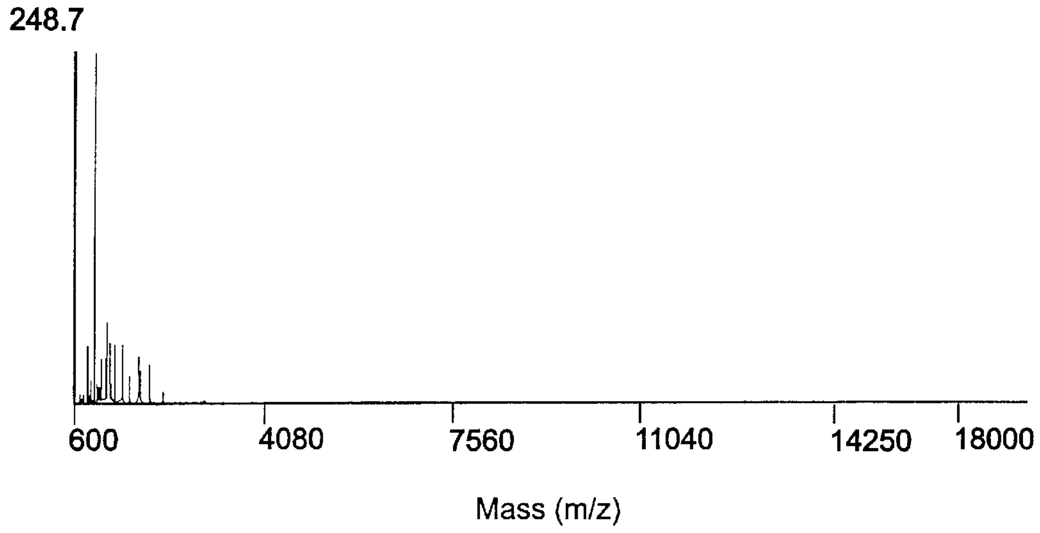
FIG. 7*a* shows the positive ion mass spectrum obtained with no charge reduction.
Figure 7B:
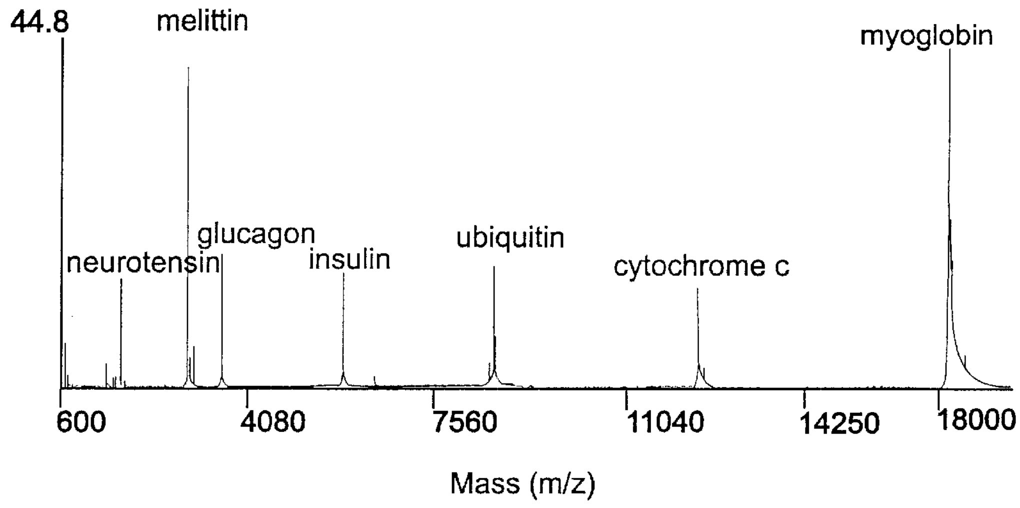
FIG. 7*b* shows the positive ion mass spectrum obtained upon applying a voltage of —1.75 kV to the platinum wire electrode in the corona discharge.

The use of charge reduction for the quantitative analysis of a mixture of proteins was also investigated using ES-TOF/MS with corona discharge charge reduction. FIG. 7 shows spectra obtained upon the electrospray discharge of 0.5 $\mu$M equimolar mixture in 1:1 $H_2O/CH_3CN$ with 1% acetic acid containing neurotensin (1,672.9 amu), melittin (2,847.5 amu), glucagon (3,482.8 amu), bovine insulin (5,736.6 amu), equine cytochrome c (12,360) and apomyoglobin (16,951 amu). The average mass spectra shown represent experimental conditions of a 250 s sampling interval at a spectral acquisition rate of 10 kHz. Each run consumed 0.71 $\mu$l of sample and the spectra shown are the result of smoothing the raw spectrum by a convolution with a Gaussian function. FIG. 7*a* shows the positive ion mass spectrum obtained for the analysis of the protein mixture with no charge reduction. This spectrum is typical for the ES-TOF/MS analysis of samples containing mixtures of proteins and is characterized by a large number of overlapping peaks (approximately 17) corresponding to a plurality of charge states populated for each analyte present in the mixture. Accordingly, it is difficult to assign the peaks spectrum in FIG. 7*a* to individual analytes and/or to gain any quantitative information. In contrast, FIG. 7*b* shows the positive ion mass spectrum obtained upon applying a voltage of −1.75 kV to the corona discharge. As shown in FIG. 7*b*, use of the negative mode corona discharge results in a much less complex spectrum primarily comprised of 7 major peaks each individually attributable to a single analyte compound analyzed. Accordingly the spectrum in FIG. 7*b* is easily assignable by those skilled in the art of mass spectrometry. In addition, the spectrum in FIG. 7*b* is more readily analyzed to obtain an accurate measurement of the concentrations of each component in the mixture because the total signal attributable to each analyte is distributed in fewer peaks.

FIGS. 6–7 exhibit a decrease in net signal intensity with increasing extent of charge reduction. The explanation for this behavior is not completely understood. It is thought that a portion of this loss of signal is due to the complete neutralization of analyte ions in the field desorption-charge reduction region prior to sampling by the mass spectrometer. Such neutral species are not detectable by the TOF mass spectrometer and, therefore, would not contribute to analyte ion signals. However, the significant decrease in spectral complexity observed in FIGS. 6–7 ultimately leads to increased detection sensitivity which tends to offset the net loss of signal observed under experimental conditions resulting in a high degree of charge reduction. Additionally, it should be noted that operation of the present invention without the presence of the shield element resulted in a dramatic decreases in signal intensity and no measurable charge reduction. It is believed that this is due to the effects of electric fields generated by the electrically biased corona discharge electrode which leads to substantially increased losses of gas phase analyte ions and/or charged droplets to the walls.

The results shown in FIGS. 6–7 demonstrate the suitability of the present methods and devices for the analysis of samples containing one protein analyte or a plurality of protein analytes. The present methods and devices improve the use of electrospray ionization methods for the quantitative analysis of protein samples by substantially reducing spectral complexity which allows for easier assignment and quantification of the spectra obtained.

EXAMPLE 2

Analysis of DNA Containing Samples

Figure 8A:
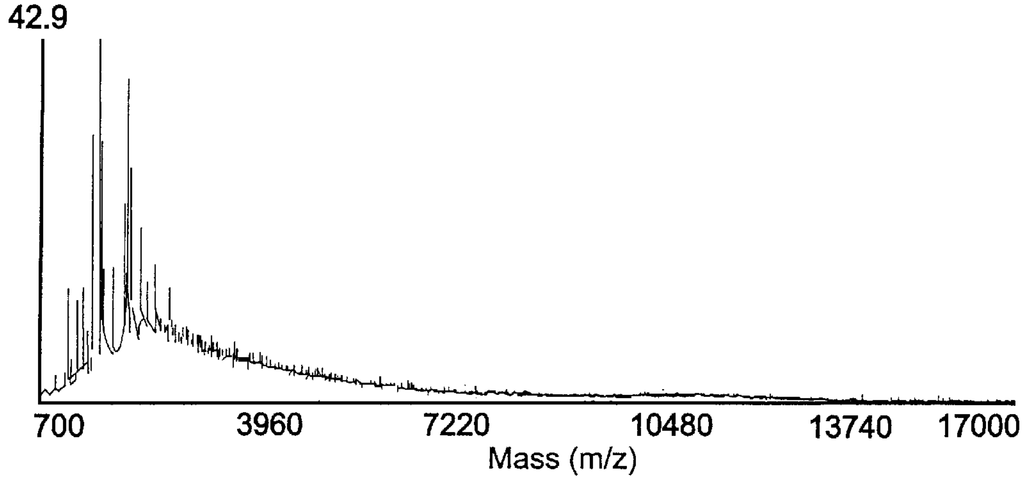
FIG. 8*a* shows the negative ion mass spectrum obtained with no charge reduction.
Figure 8B:
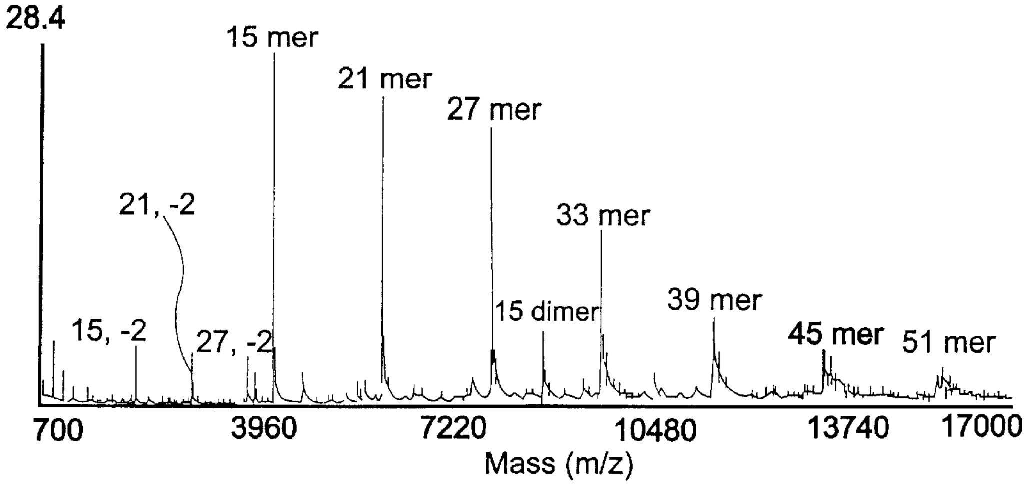
FIG. 8*b* shows the negative ion mass spectrum obtained upon applying a voltage of 1.75 kV to the platinum wire electrode in the corona discharge.

The use of the present invention for detection and quantification of oligonucleotide analytes was demonstrated by analyzing liquid solutions containing known quantities of oligonucleotide analytes using charge reduction ES-TOF/MS. Specifically, a 5 $\mu$M equal molar mixture in 1:2 $H_2O$/MeOH, 200 mM 1,1,1,3,3,3-hexafluoro-2-propanol (HFIP) containing seven oligonucleotides, 15, 21, 27, 33, 39, 45 and 51 nucleotides in length, was analyzed using charge reduction techniques employing negative mode electrospray in combination with positive mode corona discharge. The averaged mass spectra represent experimental conditions of a 500 s sampling interval at a spectral acquisition rate of 10 kHz. Each run consumed 1.08 $\mu$l of sample and the spectra shown are the result of smoothing the raw spectrum by a convolution with a Gaussian function. FIG. 8*a* shows the negative ion mass spectrum obtained with no charge reduction. This spectrum is typical for the ES-TOF/MS analysis of samples containing a mixture of oligonucleotides and is characterized by a plurality of overlapping peaks (approximately 20) corresponding to a large number of charged states populated for each analyte present. Accordingly, in the spectrum shown in FIG. 8*a* it is difficult to assign and/or quantify the signals attributable to individual oligonucleotide analytes. In contrast, FIG. 8*b* shows the negative ion mass spectrum observed upon discharge of the same solution containing a mixture of oligonucleotides upon applying a voltage of 1.75 kV to the corona discharge. As shown in FIG. 8*b*, use of the positive mode corona discharge results in a much less complex spectrum primarily comprised of 8 major peaks corresponding to the singly and doubly charged ions for each oligonucleotide present. The decrease in complexity shown in FIG. 8*b* may be attributed to a substantial reduction of the number of charge-states populated for each of the oligonucleotide analytes present in the mixture. As a result of this reduced complexity, the spectrum in FIG. 8*b* is much more easy to assign by those of ordinary skill in the art of mass spectrometry. In addition, the spectrum in FIG. 8*b* is more easily used to obtain quantitative measurements of the concentrations of every component in the mixture because the total signal attributable to each analyte is distributed in fewer peaks.

In addition to decreasing spectral complexity by reducing the number of multiply charged states populated for each analyte, the charge reduction technique employed here also reduces the occurrence of undesirable fragmentation of analyte ions produced by electrospray discharge. A comparison of FIG. 8*a* with FIG. 8*b* shows that a number of peaks in the low m/z region that do not correspond to multiply charged states of the analyte ions are only present in the non-charge reduced spectra. The m/z ratios and isotopic distributions of these peaks suggest that they predominantly correspond to singly charged fragment ions. The disappearance of these peaks in the charge reduced spectra suggests that charge reduction decreases the occurrence of fragmentation by shifting analyte ion charge-state distributions to more stable lower charged states. The avoidance of analyte ion fragmentation with charge reduction is beneficial because it further reduces spectral complexity and results in a substantial reduction of chemical noise.

As in the Example I, FIG. 8 shows a decrease in net signal intensity with increasing extent of charge reduction. The explanation for this behavior is not completely understood. It is thought that a portion of this loss of signal is due to the conversion of a portion of the analyte ions into neutral species that are not detectable by the TOF mass spectrometer. However, the reduction in spectral complexity and decrease in chemical noise levels in FIG. 8*b* ultimately tends to increase the detection sensitivity thereby offsetting net loss of signal under experimental conditions resulting in a high degree of charge reduction. Additionally, it should be noted that operation of the present invention without the presence of the shield element resulted in dramatic decreases in signal intensity and no measurable charge reduction. It is believed that this is due to the effects of electric fields generated by the electrically biased corona discharge electrode leading to substantially increased losses of gas phase analyte ions and/or charged droplets to the walls.

The results shown in FIG. 8 demonstrate the applicability of the present methods and devices for the analysis of the composition of mixtures of oligonucleotides. Specifically, the incorporation of charge reduction techniques to the ES-TOF/MS analysis of samples containing oligonucleotides decreases overall spectral complexity and tends to reduce the magnitude of chemical noise. In addition, use of charge reduction techniques decreases the occurrence of unwanted analyte ion fragmentation. These gains ultimately provide mass spectra of complex mixtures of oligonucleotides that are easier to assign and quantify than non-charge reduced ES-TOF spectra.

EXAMPLE 3

Analysis of Polyethelene Glycol Polymers

The use of the present invention for detection and quantification of commercial organic polymers was demonstrated by analyzing liquid solutions containing polyethelene glycol polymers (PEG) samples of known average molecular weight using charge reduction ES-TOE/MS. The PEG samples analyzed comprise a distribution of PEG polymers of varying lengths characterized by their average molecular weight. Specifically, a solution containing PEG samples of average molecular weights of 2,000 Da and 10,000 Da was analyzed using charge reduction employing positive mode electrospray in combination with negative ion mode corona discharge. The averaged positive ion mass spectra represent the electrospray discharge of 0.05 μg/μl samples in a 50:50 methanol to water solution and are displayed as plots of intensity verses mass to charge ratio (m/z).

Figure 9A:
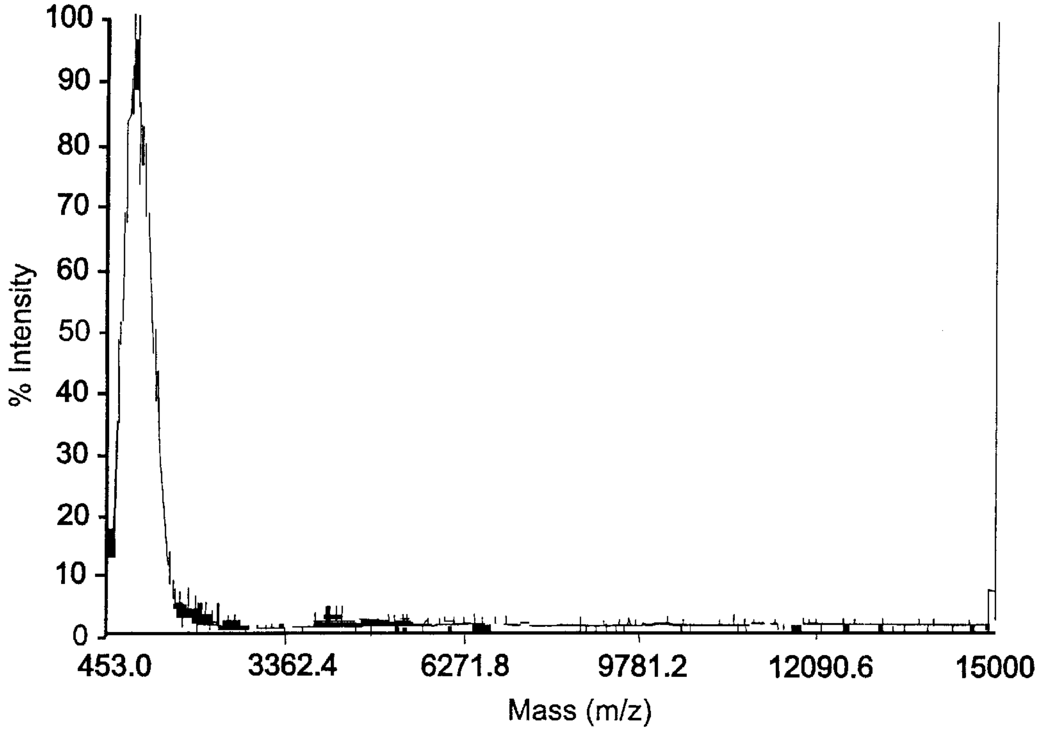
FIG. 9*a* shows the positive ion mass spectrum obtained with no charge reduction.
Figure 9B:
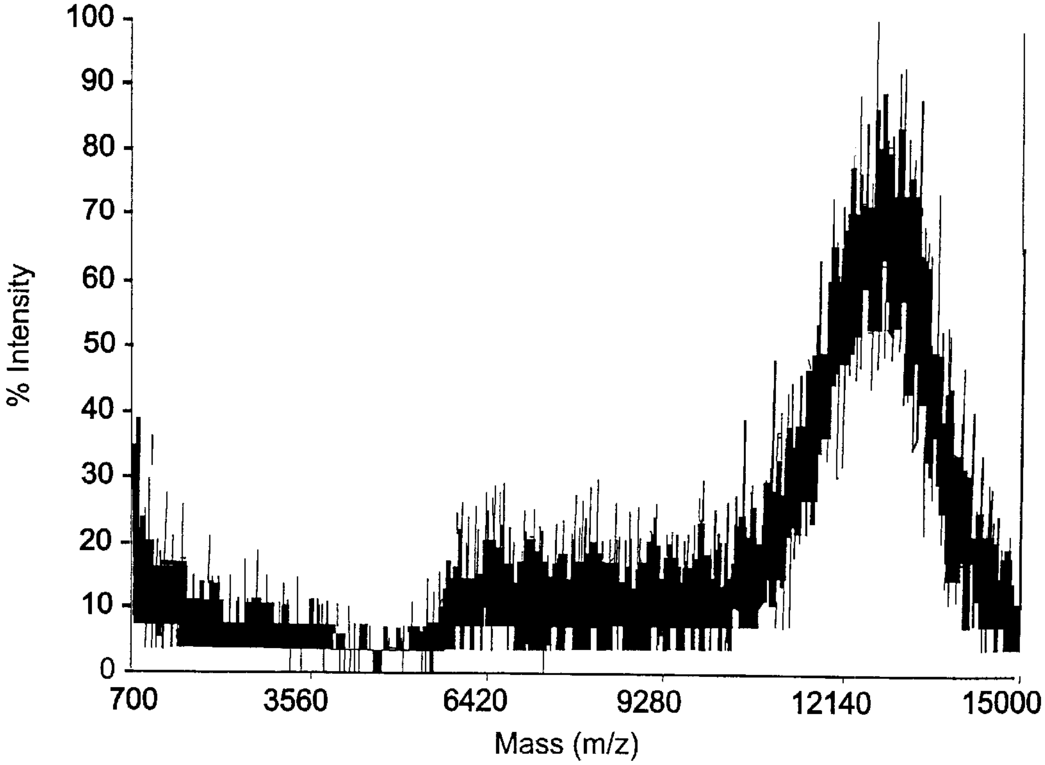
FIG. 9*b* shows the positive ion mass spectrum obtained upon applying a voltage of −3.0 kV to the platinum wire electrode in the corona discharge

FIG. 9*a* shows the spectrum obtained for analysis of a solution containing 10,000 Da and 2,000 average molecular weight polymer samples with no voltage applied to the corona discharge. This spectnim is typical for the ES-TOF/MS analysis of samples containing PEG polymer analytes and is primarily characterized by a large single peak centered around 1,000 m/z. The central peak at 1,000 m/z may be attributed to proportionate multiple charging of analyte ions generated from both PEG samples. As shown in FIG. 9*a*, the composition of either PEG sample in the mixture is not readily resolvable within the convoluted bundle of overlapping peaks. In contrast, FIG. 9*b* shows the spectrum obtained for the electrospray discharge of the same PEG sample upon the applying of a voltage of −3.0 V to the corona discharge. The spectrum in FIG. 9*b* is characterized by two series of peaks centered around 2,000 m/z and 10,000 m/z which correspond to each PEG sample in the mixture. As demonstrated in FIG. 9*b*, application of −3.0 V to the corona discharge resulted in generation of gas phase PEG analyte ions primarily consisting of singly charged ions. Accordingly, the size distribution of each PEG sample dissolved in solution is readily discernible in FIG. 9*b*. The series of peaks that center around 2,000 m/z corresponds to the distribution of polymers present in the 2,000 Da average molecular weight sample and the series of peaks that center around 10,000 m/z corresponds to the distribution of polymers present in the 10,000 Da average molecular weight sample. The application of charge reduction for the analysis of PEG polymer samples not only resolves the identity of individual polymers present in the each sample, but also provides measurement of the amount of each polymer of different length comprising the distribution.

Further experiments have indicated that the degree of charge reduction achieved upon the electrospray discharge of solutions containing PEG samples is adjustable by varying the voltage applied to the corona discharge. This aspect of the present invention may be of Importance in the analysis of polymers that possess sizes extending beyond the range of commercially available mass spectrometers. Accordingly, the devices and methods of the present invention may be useful in the analysis of extremely high molecular weight compounds by working under experimental conditions yielding primarily doubly, triply or quadruply charged analyte ions.

Although the description above contains many specificities, these should not be construed as limiting the scope of the invention but as merely providing illustrations of some of the presently-preferred embodiments of this invention. Thus, the scope of the invention should be determined by the appended claims and their legal equivalents, rather than by the examples given.

We claim:

1. An ion source for preparing gas phase analyte ions from a liquid sample, containing chemical species in a solvent, carrier liquid or both, wherein the charge-state distribution of the gas phase analyte ions prepared may be selectively adjusted, said device comprising:

a) an electrically charged droplet source for generation of a plurality of electrically charged droplets of the liquid sample in a flow of bath gas;

b) a field desorption-charge reduction region of selected length, cooperatively connected to the electrically charged droplet source and positioned at a selected distance downstream with respect to the flow of bath gas for receiving the flow of bath gas and electrically charged droplets, wherein at least partial evaporation of solvent, carrier liquid or both from the droplets generates gas phase analyte ions and wherein the charged droplets, analyte ions or both remain in the field desorption-charge reduction region for a selected residence time;

c) a reagent ion source, cooperatively connected and downstream of the electrically charged droplet source for generating electrons, reagent ions or both from the bath gas and which also generates an electric field, an electromagnetic field or both wherein the electrons, reagent ions or both react with droplets, analyte ions or both in the flow of bath gas within at least a portion of the field desorption-charge reduction region to reduce the charge-state distribution of the analyte ions in the flow of bath gas to generate gas phase analyte ions having a selected charge-state distribution; and d) a shield element surrounding the reagent ion source for substantially confining the electric field, electromagnetic field or both generated by the reagent ion source defining a shielded region wherein fields from the reagent ion source are minimized;

wherein the residence time of droplets, analyte ions or both, the abundance of electrons, reagent ions, or both in the field desorption-charge reduction region, type of bath gas, reagent ion or both or any combinations thereof is adjusted to control the charge-state distribution of the output of the ion source.

2. The ion source of claim 1 comprising at least one flow inlet, cooperatively connected to said electrically charged droplet source, for the introduction of bath gas into said field desorption-charge reduction region.

3. The ion source of claim 1 wherein said chemical species are polymers.

4. The ion source of claim 1 wherein said chemical species are selected from the group consisting of:

a) one or more oligopeptides ranging from about 1 to about 2000 amino acids in length;

b) one or more oligonucleotides ranging from about 1 to about 2000 nucleotides in length; and c) one or more carbohydrates.

5. The ion source of claim 1 wherein said electrically charged droplet source is selectively positionable along the axis of said flow of bath gas to provide adjustable selection of the distance between the electrically charged droplet source and the reagent ion source.

6. The ion source of claim 1 wherein said electrically charged droplet source is selected from the group consisting of:

a) a positive pressure electrospray source;

b) a pneumatic nebulizer;

c) a piezo-electric pneumatic nebulizer;

d) a thermospray vaporizer;

e) an atomizer;

f) an ultrasonic nebulizer; and g) a cylindrical capacitor electrospray source.

7. The ion source of claim 1 wherein said reagent ion source comprises a corona discharge.

8. The ion source of claim 7 wherein said corona discharge comprises a first electrically biased element and a second electrically biased element held substantially close to ground, wherein said first electrically biased element and said second electrically biased element are separated by a distance close enough to create a self-sustained electrical gas discharge.

9. The ion source of claim 8 wherein said first electrically biased element is held at a positive voltage.

10. The ion source of claim 8 wherein said first electrically biased element is held at a negative voltage.

11. The ion source of claim 8 wherein said first and second electrically biased elements have an adjustable potential difference ranging from approximately 10,000 V to approximately −10,000 V to provide control of the abundance of the reagent ions within the field desorption-charge reduction region.

12. The ion source of claim 8 wherein said first and second electrically biased elements have a potential difference that is fixed as a function of time.

13. The ion source of claim 8 wherein said first and second electrically biased elements have a potential difference that varies as a function of time.

14. The ion source of claim 7 wherein said corona discharge comprises an electrically biased wire electrode and a metal disc held at ground or substantially close to ground, wherein said wire electrode and said metal disc are arranged in a point to plane geometry and separated by a distance sufficiently close to create a self-sustained electrical gas discharge.

15. The ion source of claim 1 wherein said reagent ion source comprises a plurality of corona discharges.

16. The ion source of claim 15 wherein said plurality of corona discharges comprises at least one positive corona discharge, comprising a first electrically biased element held at a positive voltage and a second element held at ground or substantially close to ground, and at least one negative corona discharge, comprising a first electrically biased element held at a negative voltage and a second element held at ground or substantially close to ground, whereby said plurality of corona discharges provides a source of positively and negatively charged reagent ions to said field desorption-charge reduction region.

17. The ion source of claim 1 wherein said reagent ion source comprises a radio-frequency corona discharge comprising a first electrically biased element capable of oscillating between positive and negative voltages and a second electrically biased element held near ground, wherein said radio-frequency corona discharge is capable of providing positively and negatively charged reagent ions to said field desorption-charge reduction region.

18. The ion source of claim 1 wherein said reagent ion source is selected from the group consisting of:

a) an arc discharge;

b) a plasma;

c) a thermionic electron gun;

d) a microwave discharge;

e) an inductively coupled plasma; and f) a source of electromagnetic radiation.

19. The ion source of claim 1 wherein said reagent ion source comprises an externally housed flowing reagent ion source cooperatively coupled to said field desorption-charge reduction region and capable of providing a flow of reagent ions into the field desorption-charge reduction region.

20. The ion source of claim 1 wherein said reagent ion source is positioned far enough downstream of said electrically charged droplet source to allow substantial field desorption of said chemical species from said charged droplets prior to the interaction of the droplets with said reagent ions.

21. The ion source of claim 1 comprising an online liquid phase separation device operationally connected to said electrically charged droplet source to provide sample purification, separation or both prior to formation of said charged droplets.

22. The ion source of claim 21 wherein said online liquid phase separation device is selected from the group consisting of:

a) a high performance liquid chromatography device;

b) a capillary electrophoresis device;

c) a microfiltration device;

d) a liquid phase chromatography device; and e) a super critical fluid chromatography device.

23. The ion source of claim 1 wherein said shield element comprises a wire mesh screen.

24. The ion source of claim 1 wherein said shield element is held at an electric potential close to ground.

25. The ion source of claim 1 wherein said shield element is grounded.

26. The ion source of claim 1 wherein said shield element comprises a Faraday cage.

27. The ion source of claim 1 wherein the output of said ion source comprises gas phase analyte ions with an average ionic charge that is adjustable over the range of about +30 to about −30 elementary units of charge.

28. The ion source of claim 1 wherein the output of said ion source comprises singly charged analyte ions, doubly charged analyte ions or a mixture of both.

29. The ion source of claim 1 wherein the output of said ion source comprises gas phase analyte ions that have a molecular mass substantially similar to said chemical species in the liquid phase or solution phase.

30. The ion source of claim 1 wherein said reagent ions comprise positively charged ions, negatively charged ions or both.

31. The ion source of claim 1 wherein said bath gas is selected from of the group consisting of: nitrogen, oxygen, argon, air, helium, water, sulfur hexafluoride, nitrogen trifluoride and carbon dioxide.

32. The ion source of claim 1 wherein the residence time of the droplets, analyte ions or both is selectively adjustable by controlling the flow rate of bath gas through the field desorption-charge reduction region, adjusting the length of the field desorption-charge reduction region or both.

33. The ion source of claim 1 wherein the rate of reagent ion production by the reagent ion source is adjustable to select the concentration of reagent ions in the field desorption-charge reduction region.

34. A method for preparing gas phase analyte ions from a liquid sample, containing chemical species in a solvent, carrier liquid or both, wherein the charge-state distribution of the gas phase analyte ions prepared may be selectively adjusted, said method comprising the steps of:

a) producing a plurality of electrically charged droplets of the liquid sample in a flow of bath gas;

b) passing the flow of bath gas and droplets through a field desorption-charge reduction region of selected length, wherein at least partial evaporation of solvent, carrier liquid or both from droplets generates gas phase analyte ions and wherein the charged droplets, analyte ions or both remain in the field desorption-charge reduction region for a selected residence time;

c) exposing the droplets, gas phase analyte ions or both to electrons, reagent ions or both generated from bath gas molecules by a reagent ion source that generates an electric field, electromagnetic field or both and is surrounded by a shield element that substantially confines the electric field, electromagnetic field or both generated by the reagent ion source defining a shielded region wherein fields generated by the reagent ion source are minimized, wherein the electrons, reagent ions or both react with said droplets, charged droplets or both within at least a portion of the field desorption-charge reduction region to reduce the charge-state distribution of the analyte ions in the flow of bath gas thereby generating gas phase analyte ions having a selected charge-state distribution; and d) controlling the charge-state distribution of said gas phase analyte ions by adjusting the residence time of droplets, analyte ions or both, the abundance of electrons, reagent ions, or both, the type of bath gas, the type of reagent ion or both or any combinations thereof.

35. A device for determining the identity and concentration of chemical species in a liquid sample containing the chemical species in a solvent, carrier liquid or both, said device comprising:

a) an electrically charged droplet source for generating a plurality of electrically charged droplets of the liquid sample in a flow of bath gas;

b) a field desorption-charge reduction region of selected length, cooperatively connected to the electrically charged droplet source and positioned at a selected distance downstream with respect to the flow of bath gas for receiving the flow of bath gas and electrically charged droplets, wherein at least partial evaporation of solvent, carrier liquid or both from droplets generates gas phase analyte ions and wherein the charged droplets, analyte ions or both remain in the field desorption-charge reduction region for a selected residence time;

c) a reagent ion source, cooperatively connected and downstream of the charged droplet source for generating electrons, reagent ions or both from the bath gas and which also generates an electric field, an electromagnetic field or both, wherein the electrons, reagent ions or both react with droplets, analyte ions or both in the flow of bath gas within at least a portion of the field desortion-charge reduction region to reduce the charge-state distribution of the analyte ions in the flow of bath gas to generate gas phase analyte ions having a selected charge-state distribution;

d) a shield element surrounding the reagent ion source for substantially confining the electric field, electromagnetic field or both generated by the reagent ion source defining a shielded region wherein fields generated by the reagent ion source are minimized; and e) a charged particle analyzer operationally connected to said field desorption-charge reduction region, for analyzing said gas phase analyte ions.

wherein the residence time of droplets, analyte ions or both, the abundance of electrons, reagent ions, or both in the field desorption-charge reduction region, type of bath gas, reagent ion or both or any combinations thereof is adjusted to control the charge-state distribution of the gas phase analyte ions.

36. The device of claim 35 comprising an electrically biased element, positioned between said field desorption-charge reduction region and said charged particle analyzer, with an opening for transmitting the gas phase analyte ions from said field desorption-charge reduction region to said charged particle analyzer.

37. The device of claim 35 wherein said charged particle analyzer comprises a mass analyzer operationally connected to said field desorption-charge reduction region to provide efficient introduction of said gas phase analyte ions into said mass analyzer.

38. The device of claim 37 wherein said mass analyzer comprises a time of flight mass spectrometer positioned along an axis orthogonal to the axis of said flow of bath gas.

39. The device of claim 37 wherein said mass analyzer is selected from the group consisting of:

a) an ion trap;

b) a quadrupole mass spectrometer;

c) a tandem mass spectrometer; and d) a residual gas analyzer.

40. The device of claim 35 where said charged particle analyzer comprises an instrument for determining electrophoretic mobility of said gas phase analyte ions.

41. The device of claim 40 wherein said instrument for determining electrophoretic mobility comprises a differential mobility analyzer.

42. A method for determining the identity and concentration of chemical species in a liquid sample containing the chemical species in a solvent, carrier liquid or both, said method comprising:

a) producing a plurality of electrically charged droplets of the liquid sample in a flow of bath gas;

b) passing the flow of bath gas and the droplets through a field desorption-charge reduction region of selected length, wherein at least partial evaporation of solvent, carrier liquid or both from the droplets generates gas phase analyte ions and wherein the charged droplets, analyte ions or both remain in the field desorption-charge reduction region for a selected residence time;

c) exposing the droplets, gas phase analyte ions or both to electrons, reagent ions or both generated from bath gas molecules by a reagent ion source that generates an electric field, electromagnetic field or both and is surrounded by a shield element that substantially confines the electric field, electromagnetic field or both generated by the reagent ion source and defines a shielded region wherein fields generated by the reagent ion source are minimized, wherein the electrons, reagent ions or both react with said droplets, analyte ions or both within at least a portion of the field desorption-charge reduction region to reduce the charge-state distribution of the analyte ions in the flow of bath gas thereby generating gas phase analyte ions having a selected charge-state distribution;

d) controlling the charge-state distribution of said gas phase analyte ions by adjusting the residence time of droplets, analyte ions or both, the abundance of electrons, reagent ions, or both, the type of bath gas, the type of reagent ion or both or any combinations thereof; and e) analyzing said gas phase analyte ions with a charged particle analyzer.

43. An electrospray ionization ion source for preparing gas phase analyte ions from a liquid sample, containing chemical species in a solvent, carrier liquid or both, wherein the charge-state distribution of the gas phase analyte ions prepared may be selectively adjusted, said device comprising:

a) an electrospray chamber housing an electrospray droplet source for generating a plurality of electrically charged droplets of the liquid sample containing chemical species in a flow of bath gas;

b) a field desorption-charge reduction region of selected length, cooperatively connected to the electrospray chamber and positioned at a selected distance downstream with respect to the flow of bath gas for receiving the flow of bath gas and electrically charged droplets, wherein at least partial evaporation of solvent, carrier liquid or both from the droplets generates gas phase analyte ions and wherein the charged droplets, analyte ions or both remain in the field desorption-charge reduction region for a selected residence time;

c) a corona discharge cooperatively connected downstream of said electrospray chamber comprising an electrically biased wire electrode positioned sufficiently close to an electrically biased metal disc held substantially close to ground for generating electrons, reagent ions or both from the bath gas, wherein said wire electrode and said metal disc are arranged in a point to plane geometry and separated by a distance sufficiently close to create a self-sustained electrical gas discharge and wherein the electrons, reagent ions or both react with droplets, analyte ions or both in the flow of bath gas within at least a portion of the field desorption-charge reduction region to reduce the charge-state distribution of the analyte ions in the flow of bath gas to generate gas phase analyte ions having a selected charge-state distribution; and d) a wire mesh screen surrounding the corona discharge for substantially confining the electric field, electromagnetic field or both generated by the corona discharge defining a shielded region wherein the fields are minimized;

wherein the residence time of droplets, analyte ions or both, the abundance of electrons, reagent ions, or both in the field desorption-charge reduction region, type of bath gas, reagent ion or both or any combinations thereof is adjusted to control the charge-state distribution of the output of the ion source.

44. The electrospray ionization ion source of claim 43 comprising at least one flow inlet, operationally connected to said electrospray chamber, for the introduction of bath gas into said electrospray chamber.

45. The electrospray ionization ion source of claim 43 wherein the residence time of the droplets, analyte ions or both in the field desorption-charge reduction region is selectively adjustable by controlling the flow rate of bath gas through the field desorption-charge reduction region, adjusting the length of the field desorption-charge reduction region or both.

46. The electrospray ionization ion source of claim 43 wherein said droplets have a negative charge and said first electrically biased element is held at a positive voltage.

47. The electrospray ionization ion source of claim 43 wherein said droplets have a positive charge and said first electrically biased element is held at a negative voltage.

48. The electrospray ionization ion source of claim 43 wherein said first and second electrically biased elements have an adjustable potential difference ranging from approximately 10,000 V to approximately −10,000 V to provide control of the abundance of and charge-state distribution of the reagent ions within the field desorption-charge reduction region.

49. The electrospray ionization ion source of claim 43 wherein said field desorption-charge reduction region is housed within an electrically biased field desorption-charge reduction chamber, wherein said shield element is held at the same electric potential as the field desorption-charge reduction chamber.

50. A method of reducing the fragmentation of ions generated from electrospray discharge of a liquid sample, containing chemical species in a solvent, carrier liquid or both, said method comprising the steps of:

a) producing a plurality of electrically charged droplets of the liquid sample in a flow of bath gas by electrospray discharge;

b) passing the flow of bath gas containing the droplets through a field desorption-charge reduction region of selected length, wherein at least partial evaporation of solvent, carrier liquid or both from droplets generates gas phase analyte ions and wherein the charged droplets, analyte ions or both remain in the field desorption-charge reduction region for a selected residence time;

c) exposing the droplets, gas phase analyte ions or both to electrons, reagent ions or both generated from bath gas molecules by a reagent ion source that generates an electric field, electromagnetic field or both and is surrounded by a shield element that substantially confines the electric field, electromagnetic field or both generated by the reagent ion source defining a shielded region wherein fields generated by the reagent ion source are minimized, wherein the electrons, reagent ions or both react with said droplets, analyte ions or both within at least a portion of the field desorption region to reduce the charge-state distribution of the analyte ions in the flow of bath gas thereby generating gas phase analyte ions having a selected charge-state distribution; and d) controlling the charge-state distribution of said gas phase analyte ions by adjusting the residence time of droplets, analyte ions or both, the abundance of electrons, reagent ions in the field desorption-charge reduction region, or both, the type of bath gas, the type of reagent ion or both or any combinations thereof.

* * * * *